United States Patent
Yu et al.

(10) Patent No.: US 10,282,741 B2
(45) Date of Patent: May 7, 2019

(54) TASKSET-PARTICIPANT-CONFIGURABLE BATCH CONTENT TRANSFER SYSTEMS AND METHODS

(71) Applicant: StormX, Inc., Seattle, WA (US)

(72) Inventors: Byung Hoon Yu, Seattle, WA (US); Calvin Hsieh, Seattle, WA (US); Esther Song, Auburn, WA (US); Edward Cheung, Seattle, WA (US); Arry S Yu, Seattle, WA (US)

(73) Assignee: STORMX, INC., Seattle, WA (US)

( * ) Notice: Subject to any disclaimer, the term of this patent is extended or adjusted under 35 U.S.C. 154(b) by 0 days.

(21) Appl. No.: 15/933,281

(22) Filed: Mar. 22, 2018

(65) Prior Publication Data
US 2019/0073688 A1    Mar. 7, 2019

Related U.S. Application Data

(63) Continuation-in-part of application No. 15/874,356, filed on Jan. 18, 2018.

(60) Provisional application No. 62/554,536, filed on Sep. 5, 2017.

(51) Int. Cl.
*G06Q 30/02* (2012.01)
*G06Q 20/40* (2012.01)

(52) U.S. Cl.
CPC ....... *G06Q 30/0215* (2013.01); *G06Q 20/401* (2013.01)

(58) Field of Classification Search
None
See application file for complete search history.

(56) References Cited

U.S. PATENT DOCUMENTS

| 6,062,752 A * | 5/2000 | Pierce ............... B41J 11/005 400/522 |
|---|---|---|
| 9,569,439 B2 | 2/2017 | Davis et al. |
| 9,569,771 B2 | 2/2017 | Lesavich et al. |
| 9,576,313 B2 | 2/2017 | Kanigsberg et al. |
| 9,595,034 B2 | 3/2017 | Rooyen et al. |
| 9,646,029 B1 | 5/2017 | Baird |
| 9,672,499 B2 | 6/2017 | Yang et al. |
| 9,737,813 B2 | 8/2017 | Metuki |
| 9,747,586 B1 | 8/2017 | Frolov et al. |
| 2008/0082407 A1* | 4/2008 | Georgiadis ......... G06Q 30/02 705/14.11 |
| 2009/0287532 A1 | 11/2009 | Cohen et al. |

(Continued)

OTHER PUBLICATIONS

WorkAtHomeNoScams.com. "Amazon Work From Home Using Mechanical Turk.", Jul. 29, 2008 [online], Archived Jan. 2, 2015, [retrieved on Mar. 11, 2018]. Retrieved from the Internet <URL: https://web.archive.Org/web/20150102022023/https://www.workathomenoscams.com/2008/07/29/amazon-work-from-home-mechanical-turk/>.*

(Continued)

*Primary Examiner* — Michael W Schmucker
*Assistant Examiner* — Bion A Shelden
(74) *Attorney, Agent, or Firm* — AEON Law, PLLC; Adam L.K. Philipp; Jonathan E. Olson

(57) ABSTRACT

Methods and systems are presented for data distribution in which batch evaluations of aggregate performances of task-set-completing participants conditionally trigger eligibility notifications for upcoming on-chain batch data distributions (of cryptoassets, provenance data, or other on-list content, e.g.).

19 Claims, 20 Drawing Sheets

(56) References Cited

U.S. PATENT DOCUMENTS

| | | | |
|---|---|---|---|
| 2010/0280898 A1* | 11/2010 | Kasuya | G06Q 30/02 |
| | | | 705/14.33 |
| 2010/0332336 A9 | 12/2010 | Quigley et al. | |
| 2011/0202402 A1 | 8/2011 | Fowler et al. | |
| 2011/0313933 A1 | 12/2011 | Dai et al. | |
| 2012/0020476 A1 | 1/2012 | Billet et al. | |
| 2012/0047008 A1* | 2/2012 | Alhadeff | G06Q 30/0214 |
| | | | 705/14.16 |
| 2012/0095908 A1 | 4/2012 | Barrie et al. | |
| 2013/0061288 A1 | 3/2013 | Paim | |
| 2013/0346254 A1 | 12/2013 | Shimizu et al. | |
| 2014/0172767 A1 | 6/2014 | Chen et al. | |
| 2014/0200980 A1 | 7/2014 | Bang et al. | |
| 2014/0214845 A1 | 7/2014 | Garera et al. | |
| 2014/0272847 A1* | 9/2014 | Grimes | G09B 19/00 |
| | | | 434/236 |
| 2015/0079561 A1 | 3/2015 | Petakov et al. | |
| 2015/0170182 A1* | 6/2015 | Perez | G06Q 30/0226 |
| | | | 705/14.27 |
| 2015/0254640 A1* | 9/2015 | Cassano | G06Q 20/36 |
| | | | 705/71 |
| 2016/0012372 A1* | 1/2016 | Patel | G06Q 10/06395 |
| | | | 705/7.41 |
| 2016/0253868 A1 | 9/2016 | Burney et al. | |
| 2016/0260095 A1 | 9/2016 | Ford | |
| 2017/0039495 A1 | 2/2017 | Takehara et al. | |
| 2017/0132199 A1 | 5/2017 | Vescovi et al. | |
| 2017/0221156 A1* | 8/2017 | Mingarelli | G06Q 40/123 |
| 2017/0243239 A1* | 8/2017 | El-Eid | G06Q 30/0208 |
| 2018/0060899 A1 | 3/2018 | Das et al. | |

OTHER PUBLICATIONS

Walker, Tom. "The Evolution of Printer Technology: Then and Now". Apr. 15, 2008 [online], Archived Jul. 2, 2011, [retrieved on May 11, 2018]. Retrieved from the Internet <URL: https://web.archive.org/web/20110702070555/http://www.cartridgesave.co.uk/news/the-evolution-of-printer-technology-then-and-now/>.*

Chwierut, M. "A History of Bitcoin". Smith+Crown [online] Jun. 14, 2016 [archived on Jun. 26, 2016] [retrieved on Aug. 17, 2018]. Retrieved from Internet Archive: <URL: https://web.archive.org/web/20160626062553/https://www.smithandcrown.com/a-history-of-bitcoin/> (Year: 2016).*

Danova, H. "Bitcoin Wallets. Part 1: How Do they Work". CEXIO Blog [online] May 19, 2014 [retrieved on Aug. 17, 2018]. Retrieved from Internet: <URL https://blog.cex.io/cryptonews/btc-wallet-p1-2982> (Year: 2014).*

"Kiosk." Merriam-Webster.com [retrieved on Aug. 17, 2018]. <URL: https://www.merriam-webster.com/dictionary/kiosk> (Year: 2018).*

WorkAtHomeNoScams.com "Amazon Work From Home Using Mechanical Turk.", Jul. 29, 2008 [online]. [retrieved on Mar. 22, 2018] Retrieved from the internet URL: https://web.archive.org/web/20150102022023/https://www.workathomenoscams.com/2008/07/29/amazon-work-from-home-mechanical-turk/.

Alex York; Reach vs Impressions: Know the Difference Between Your Engagement Terms; Oct. 11, 2017URL: https://sproutsocial.com/insights/reach-vs-impressions/.

Alexa Matia; Ad Fraud 101: 8 Types of Ad Fraud That Plague All Marketers; Dec. 27, 2016URL: http://blog.ezanga.com/blog/ad-fraud-101-types-of-ad-fraud-that-plague-all-marketers.

App Engagement the New Frontier for Customer Experience?; Jun. 24, 2015URL: www.pymnts.com/news/2015/is-app-engagement-the-new-frontier-for-customer-experience/.

Brandon Katz; Digital Ad Spending Will Surpass TV Spending for the First Time in U.S. History; Sep. 14, 2016URL: https://www.forbes.com/sites/brandonkat./2016/09/14/digital-ad-spending-will-surpass-tv-spending-for-the-first-time-in-u-s-history/.

Brian Rashid; The Rise of the Freelancer Economy; Jan. 26, 2016URL: www.forbes.com/sites/brianrashid/2016/01/26/the-rise-of-the-freelancer-economy/#21d165ac3bdf.

Caitlin Johnson; Cutting Through Advertising Clutter; Sep. 17, 2006URL: https://www.cbsnews.com/news/cutting-through-advertising-clutter/.

Cisco Visual Networking Index: Global Mobile Data Traffic Forecast Update, 2016-2021 White Paper; Mar. 28, 2017URL: http://www.cisco.com/c/en/us/solutions/collateral/service-provider/visual-networking-index-vni/mobile-white-paper-c11-520862.html.

Dune Lawrence; Bitcoin Believers are Ripe for Scammers; May 7, 2014; URL: https://www.bloomberg.com/news/articles/2014-05-07/sec-bitcoin-believers-are-ripe-for-scammers.

Elaine Pofeldt; McKinsey Study: Gig-Economy Workforce Is Bigger Than Official Data Shows in U.S., Europe; Oct. 10, 2016URL: www.forbes.com/sites/elainepofeldt/2016/10/10/mckinsey-study-independent-workforce-is-bigger-than-official-data-shows-in-u-s-europe/#1f02defa64ac.

Farzana Nasser; User Acquisition Is So Over, Focus on Engagement; Sep. 17, 2015URL: http://readwrite.com/2015/09/17/acquisition-dead-engagement-app-installs/.

Hubspot websiteURL: https://www.hubspot.com/marketing-statistics.

Joe Nguyen; Ad Fraud in Mobile Advertising: The Next Battleground; Aug. 22, 2016URL: https://www.comscore.com/Insights/Blog/Ad-Fraud-in-Mobile-Advertising-The-Next-Battleground.

Mechanical Turl showing 20%+ depending on amount earned.URL: requester.mturk.com/pricing.

Mobile Ad Fraud prevention vendor called App Flyer URL: https://www.appsflyer.com/product/protect360/.

Mt. Gox as documented in Wikipedia.

Silk road as documented on Wikipedia.

Stewart Rogers; 24 billion clicks show mobile ad fraud is rampant: 8 networks are 100% fraudulent; May 5, 2017URL: https://venturebeat.com/2017/05/05/24-billion-clicks-show-mobile-ad-fraud-is-rampant-8-networks-are-100-fraudulent/.

Tobias G.; A Guide to CPI Fraud and How to Stop Fraudulent Conversions; Sep. 5, 2015URL: https://24metrics.com/blog/how-to-stop-fraudulent-conversions/.

URL: forum.fiverr.com/t/payment-fees/2993/12.

URL: https://basicattentiontoken.org.

URL: www.upwork.com/i/how-it-works/freelancer/?section=get-paid.

* cited by examiner

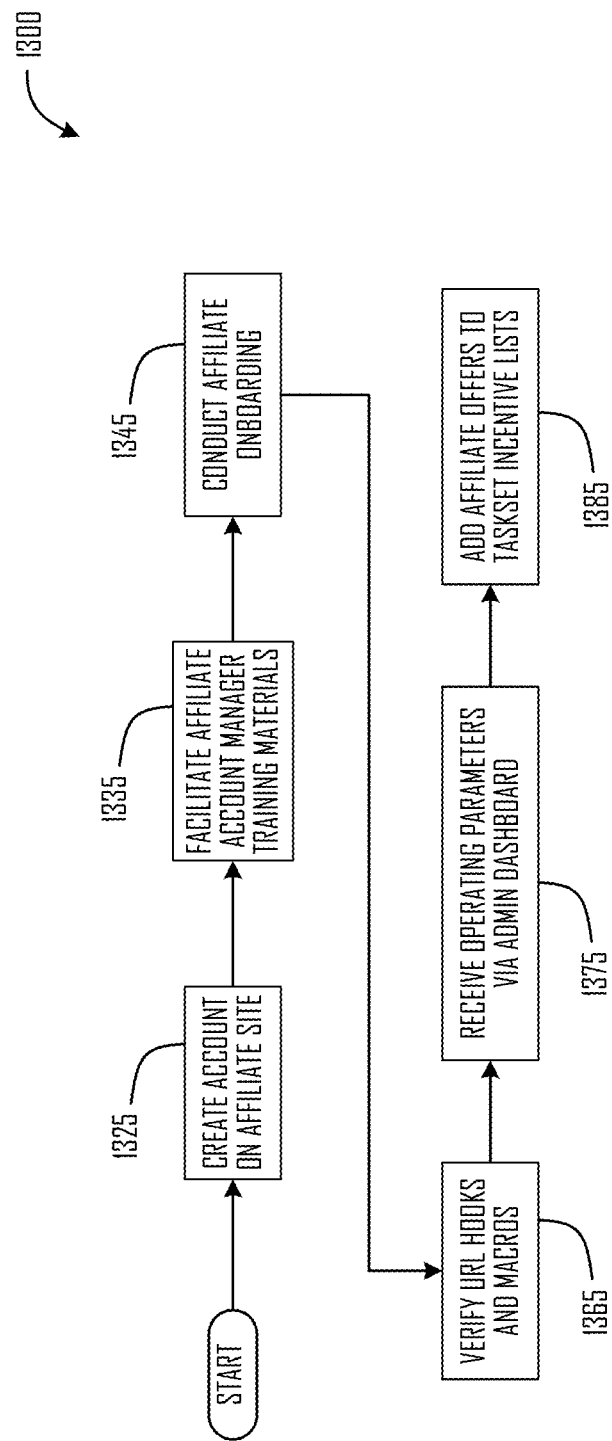

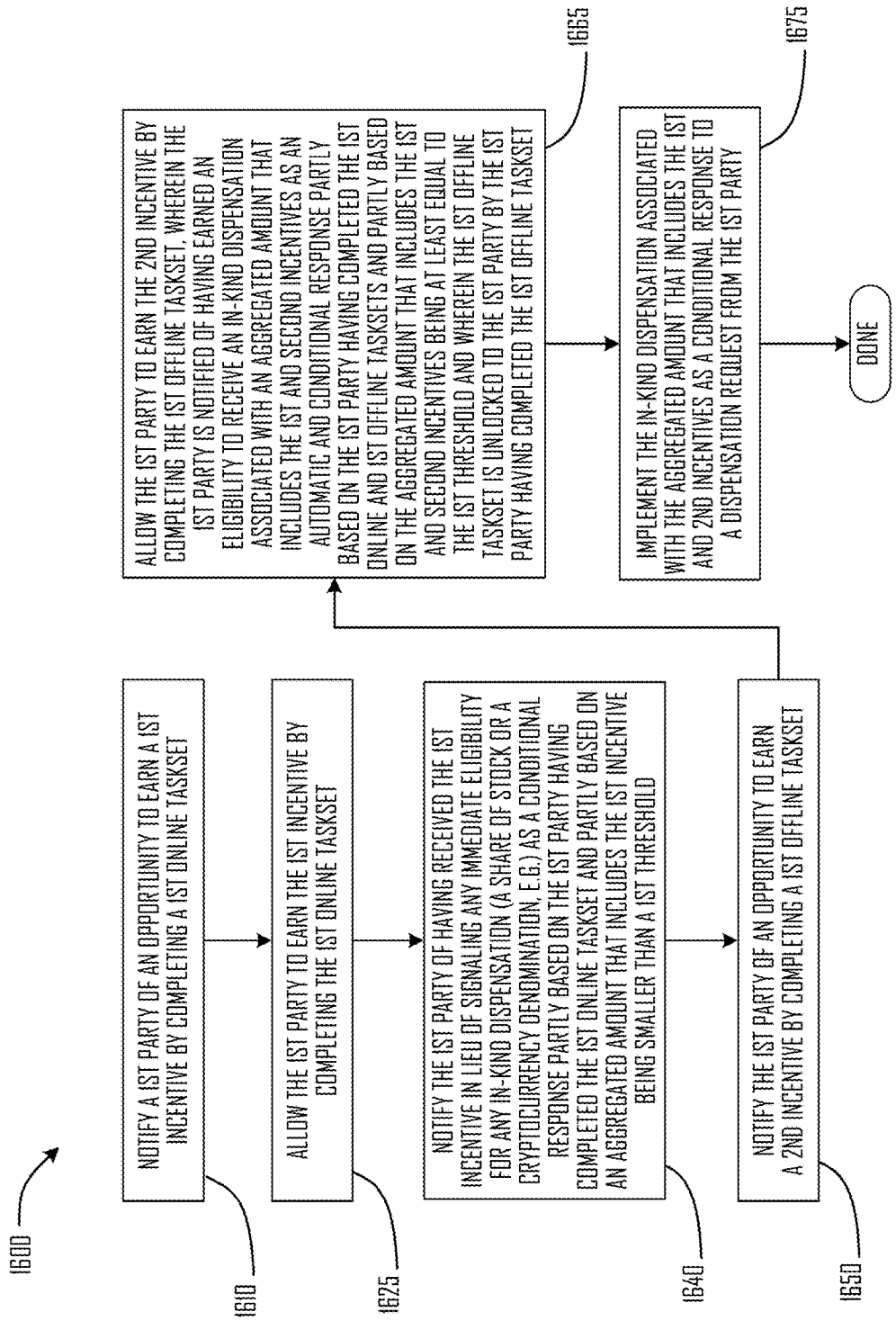

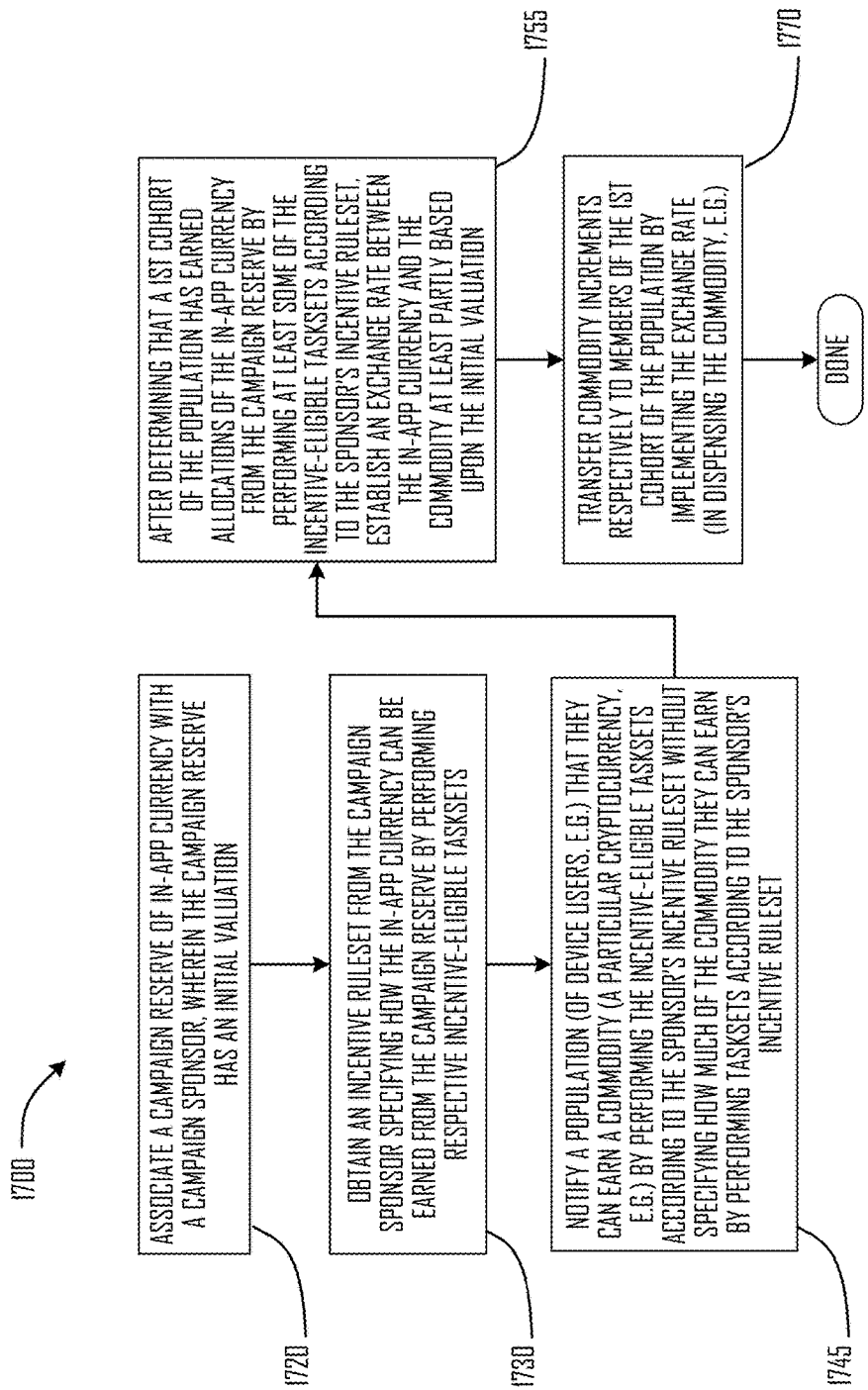

TASKSET-PARTICIPANT-CONFIGURABLE BATCH CONTENT TRANSFER SYSTEMS AND METHODS

RELATED APPLICATIONS

This application claims the benefit of provisional U.S. Prov. App. No. 62/554,536 (entitled "Normalized incentivization systems and methods to facilitate decentralized task management" and filed 5 Sep. 2017) and of U.S. application Ser. No. 15/874,356 (entitled "Normalized incentivization systems and methods to facilitate decentralized task management" and filed 18 Jan. 2018).

BRIEF DESCRIPTION OF THE DRAWINGS

FIG. 13 depicts an affiliate enlistment flow in which one or more improved technologies may be incorporated.

FIG. 16 depicts an incentivization flow in which one or more improved technologies may be incorporated.

FIG. 17 depicts another incentivization flow in which one or more improved technologies may be incorporated.

DETAILED DESCRIPTION

Figure 1:
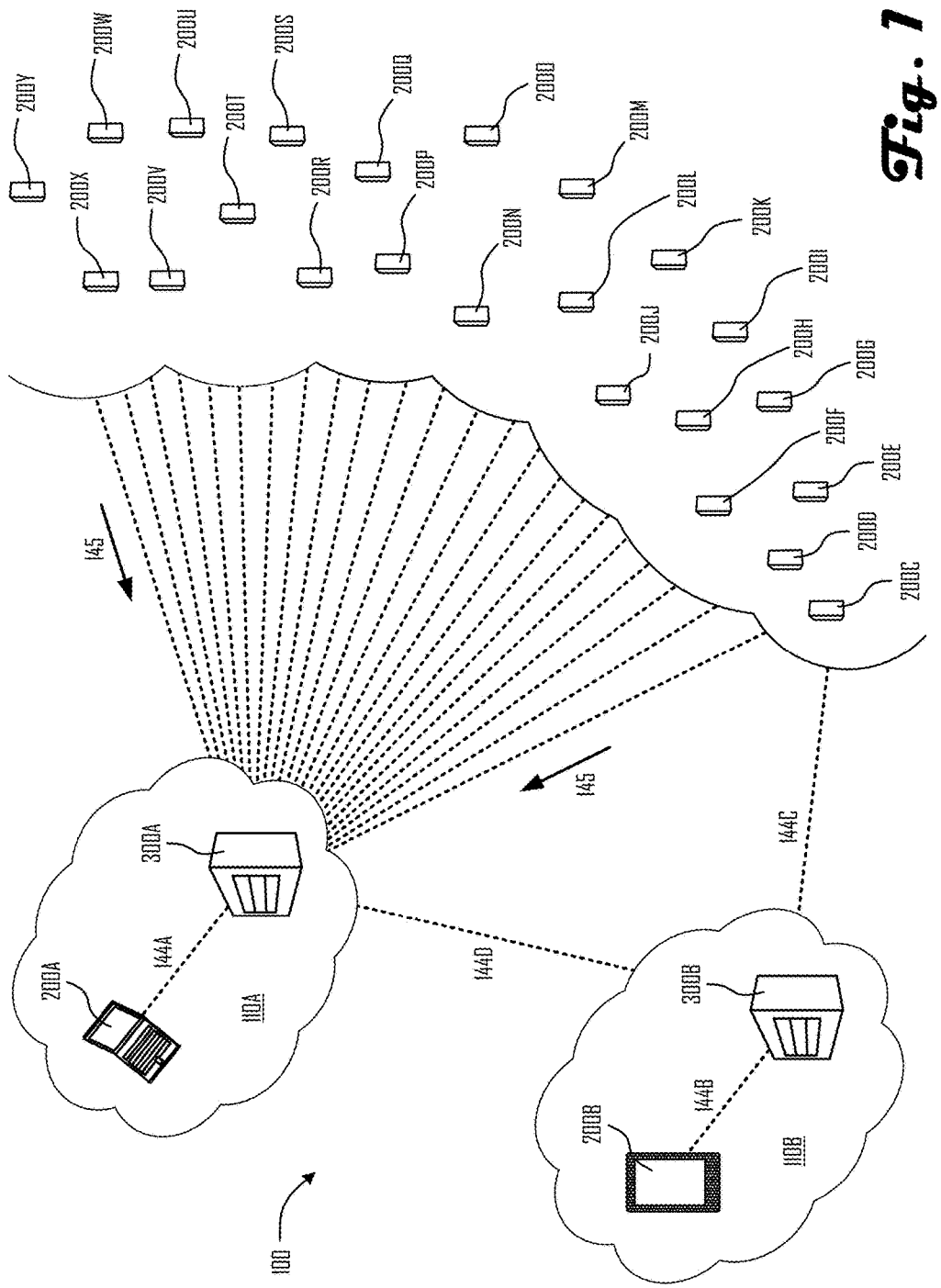
FIG. 1 depicts a system in which respective entities each employ one or more servers or client devices in which one or more improved technologies may be incorporated.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"A priori," "above," "aggregated," "allowed," "apparent," "as," "associated," "automatic," "based," "batch," "before," "being," "caused," "changed," "completed," "conditional," "configured," "described," "determined," "disclosed," "distributed," "eligible," "first," "for," "from," "human," "identified," "included," "likewise," "local," "manifesting," "many," "matching," "mixed," "more," "off-chain," "off-list," "offline," "older," "on-chain," "on-list," "online," "prior," "particular," "recent," "requested," "respective," "responsive," "scalar," "second," "sequential," "several," "signaling," "to," "transmitting," "true," "unique," "unlocked," "updated," "via," "with," or other such descriptors herein are used in their normal yes-or-no sense, not merely as terms of degree, unless context dictates otherwise. In light of the present disclosure those skilled in the art will understand from context what is meant by "remote" and by other such positional descriptors used herein. Likewise they will understand what is meant by "partly based" or other such descriptions of dependent computational variables/signals. "On-chain" refers to (permanent) inclusion in a blockchain, whether or not such content is public or transparent. "On-list" encompasses not only on-chain but also other content linked and effectively rendered immutable using cryptography (in a consensus-based data verification, e.g.). In an implementation that includes "on-list" content (a blockchain or tangle, e.g.) as described below, "off-list" refers to content elements (an in-app account ledger, e.g.) that have yet to be included "on-list." A "batch" data distribution (broadcast, e.g.) is one in which data is directed to numerous recipients (i.e. dozens or more) within a limited time (i.e. less than 24 hours) after a triggering event (an administrator action or weekly trigger time, e.g.). Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

As used herein and consistent with common parlance, an "online" taskset refers to one or more tasks primarily performed by a party while online (i.e. via a computing device in communication with or through a network of devices). Such tasksets include creating online accounts remotely, receiving streaming content (ads or training materials, e.g.), transmitting content (digitally encoded remarks, e.g.) via electrical or optical communications linkages, or other such tasks performed via a network linkage. Likewise an "offline" taskset refers herein to one or more tasks primarily performed by a party while offline (i.e. not via a computing device in communication with a network of devices). Such tasksets include traveling in person, talking face-to-face, handling or manipulating real-world objects, taking medication, or other such tasks performed in person. A taskset may be "offline" even if it includes an online reporting component, however. And if the offline and online portions of a given taskset are similar in magnitude (each being 40% to 60% of the whole, e.g.) then that taskset is neither an "online" nor an "offline" taskset, but is rather a "hybrid" as described herein.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 schematically illustrates a system 100 in which respective entities 110A-B interact with one another and with participating crowdsource or similar distributed devices 200C-Y many of which are, at various times, able to confirm an asset transfer or other occurrence as described below (by confirmations 145, e.g.). A sponsoring entity 110A comprises one or more affiliate servers 300A that interact with one or more client devices 200A thereof (via respective instances of linkage 144A, e.g.). A service entity 110B comprises one or more task management servers 300B that interact with one or more client devices 200B thereof (via respective instances of linkage 144B, e.g.). A party comprises one or more client devices 200C-Y and their users. In some instances (in response to interactions via linkages 144C-D, e.g.) the entities 110A-B may cooperate so that updates (indicia of offers, dispensations, or other events, e.g.) to values maintained at server 300B are received and so that adequately timely confirmations to those updates can occur in a decentralized fashion.

Figure 2:
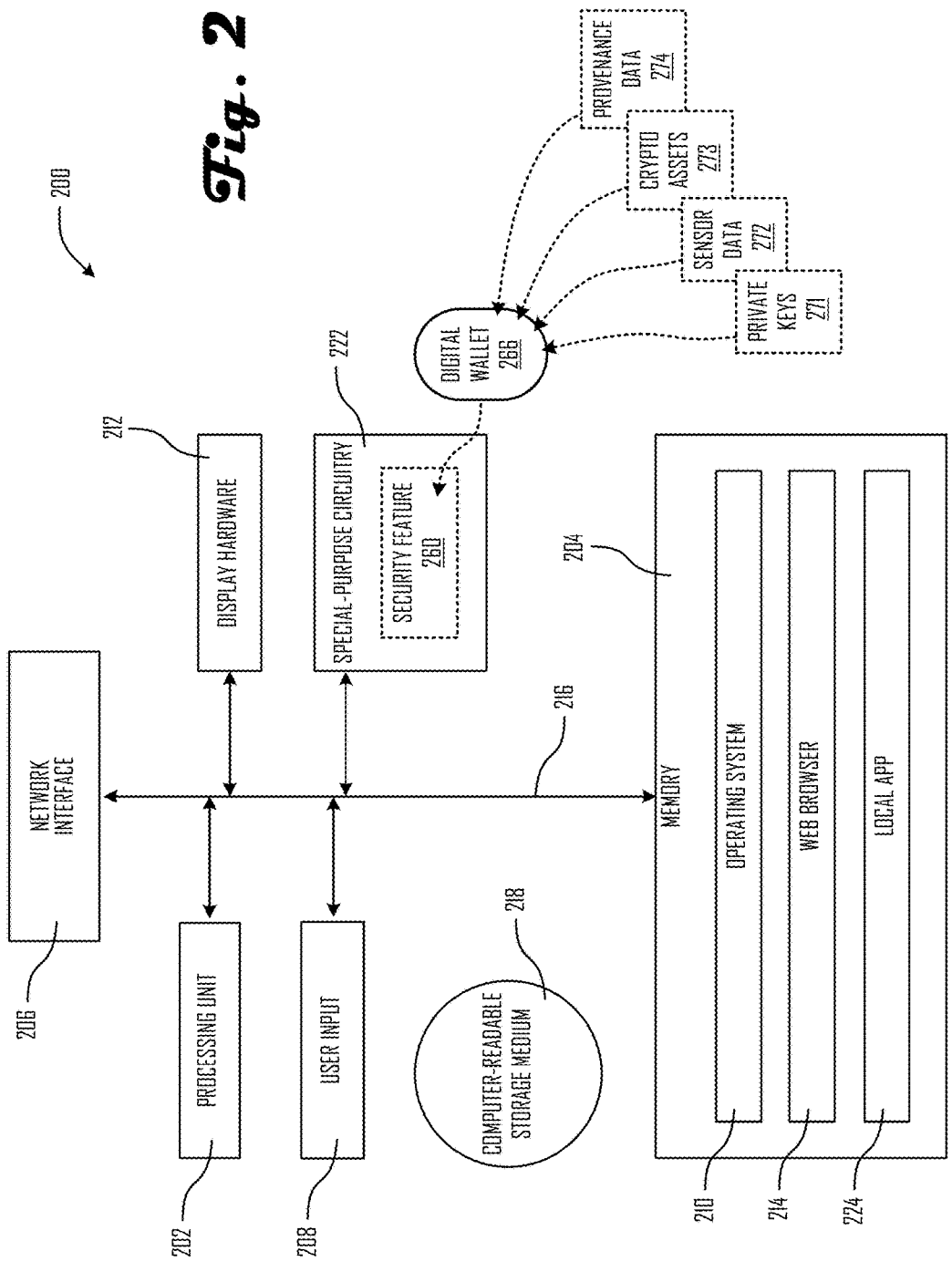
FIG. 2 depicts a network and device diagram illustrating exemplary client devices configured in which one or more improved technologies may be incorporated.

FIG. 2 illustrates several components of an exemplary client device 200 (like those of devices 200A-Y, e.g.). As used herein, a plain reference numeral (like 200, e.g.) may refer generally to a member of a class of items (like client devices, e.g.) exemplified with a hybrid numeral (like 200Q, e.g.) and it will be understood that every item identified with a hybrid numeral is also an exemplar of the class. In some embodiments, client device 200 may include many more components than those shown in FIG. 2. However, it is not necessary that all conventional components be shown in order to disclose an illustrative embodiment. As shown in FIG. 2, client device 200 includes a data network interface 206 (for connecting via the Internet or other networks to or within entities 110 of FIG. 1, e.g.).

Client device 200 may also include one or more instances of processing units 202, memory 204, user inputs 208, and display hardware 212 all interconnected along with the network interface 206 via a bus 216. Memory 204 generally comprises a random access memory ("RAM"), a read only memory ("ROM"), and a permanent mass storage device, such as a disk drive.

Memory 204 may likewise contain one or more instances of operating systems 210, web browsers 214, and local apps 224. These and other software components may be loaded from a non-transitory computer readable storage medium 218 into memory 204 of the client device 200 using a drive mechanism (not shown) associated with a non-transitory computer readable storage medium 218, such as a floppy disc, tape, DVD/CD-ROM drive, flash card, memory card, or the like. In some embodiments, software components may also be loaded via the network interface 206, rather than via a computer readable storage medium 218. Special-purpose circuitry 222 may, in some variants, include some or all of the event-sequencing logic described below (in a peer-to-peer implementation, e.g.) and one or more security features 260 (a fob or similar security apparatus, e.g.).

In some contexts security feature 260 may implement or otherwise interact with a removable or other digital wallet 266. Such wallets may (optionally) each include one or more instances of private keys 271, of sensor data 272, of cryptoassets 273, of provenance data 274, or of device-executable code snippets (smart contracts, e.g.) or the like as described below.

Figure 3:
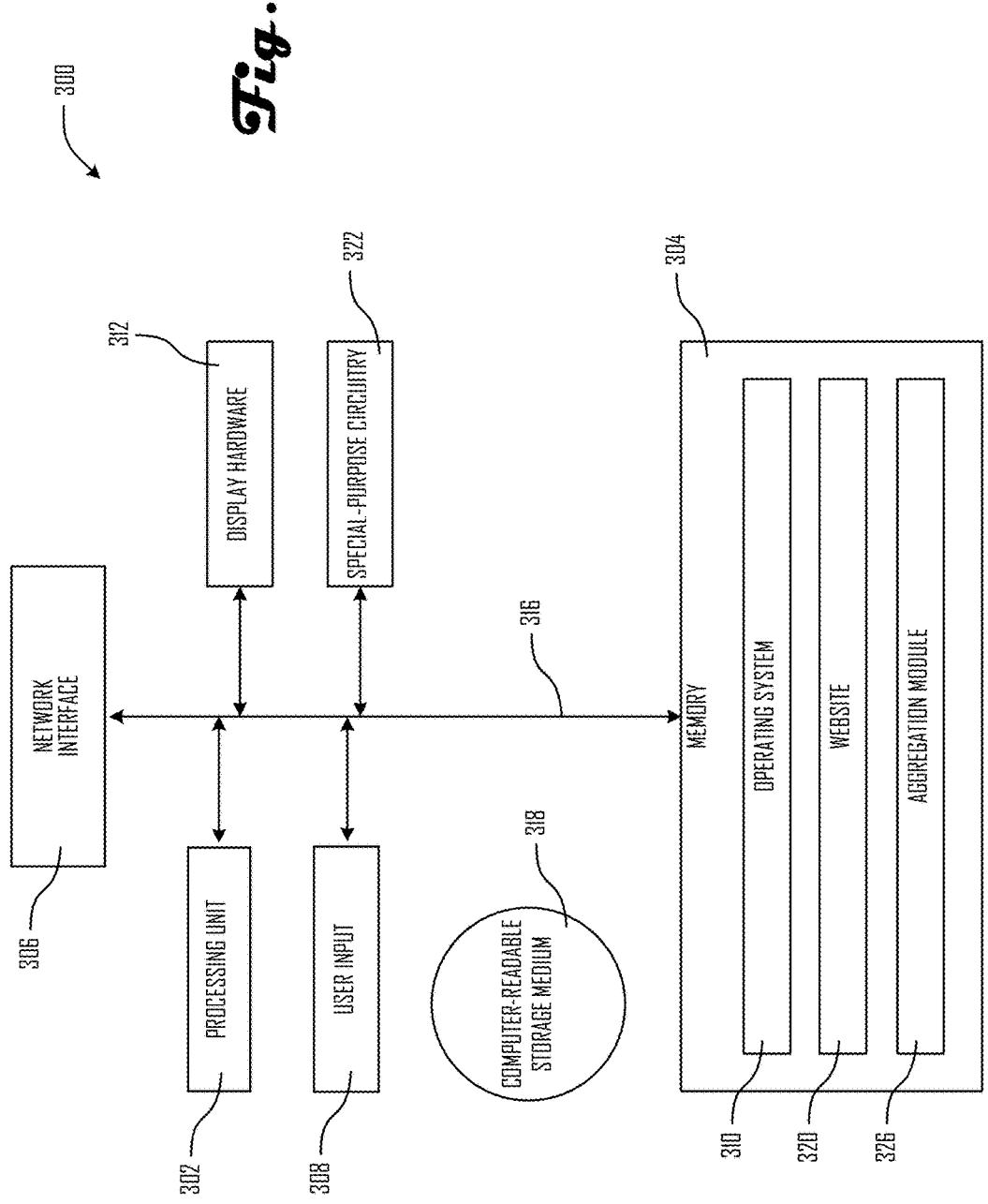
FIG. 3 depicts a server in which one or more improved technologies may be incorporated.

FIG. 3 illustrates several components of an exemplary server (like those of server 300, e.g.). As shown in FIG. 3, server 300 includes a data network interface 306 for connecting via the Internet or other networks (or both) to client devices 200A-Y of FIG. 1.

Server 300 may also include one or more instances of processing units 302, memory 304, user inputs 308, and display hardware 312 all interconnected along with the network interface 306 via a bus 316. Memory 304 generally comprises a random access memory ("RAM"), a read only memory ("ROM"), and a permanent mass storage device, such as a disk drive.

Memory 304 may likewise contain an operating system 310, hosted website 320, and aggregation module 326. These and other software components may be loaded from a non-transitory computer readable storage medium 318 into memory 304 of the server 300 using a drive mechanism (not shown) associated with a non-transitory computer readable storage medium 318, such as a floppy disc, tape, DVD/CD-ROM drive, flash card, memory card, or the like. In some embodiments, software components may also be loaded via the network interface 306, rather than via a computer readable storage medium 318. Special-purpose circuitry 322 may, in some variants, include some or all of the event-sequencing logic described below.

Figure 4:
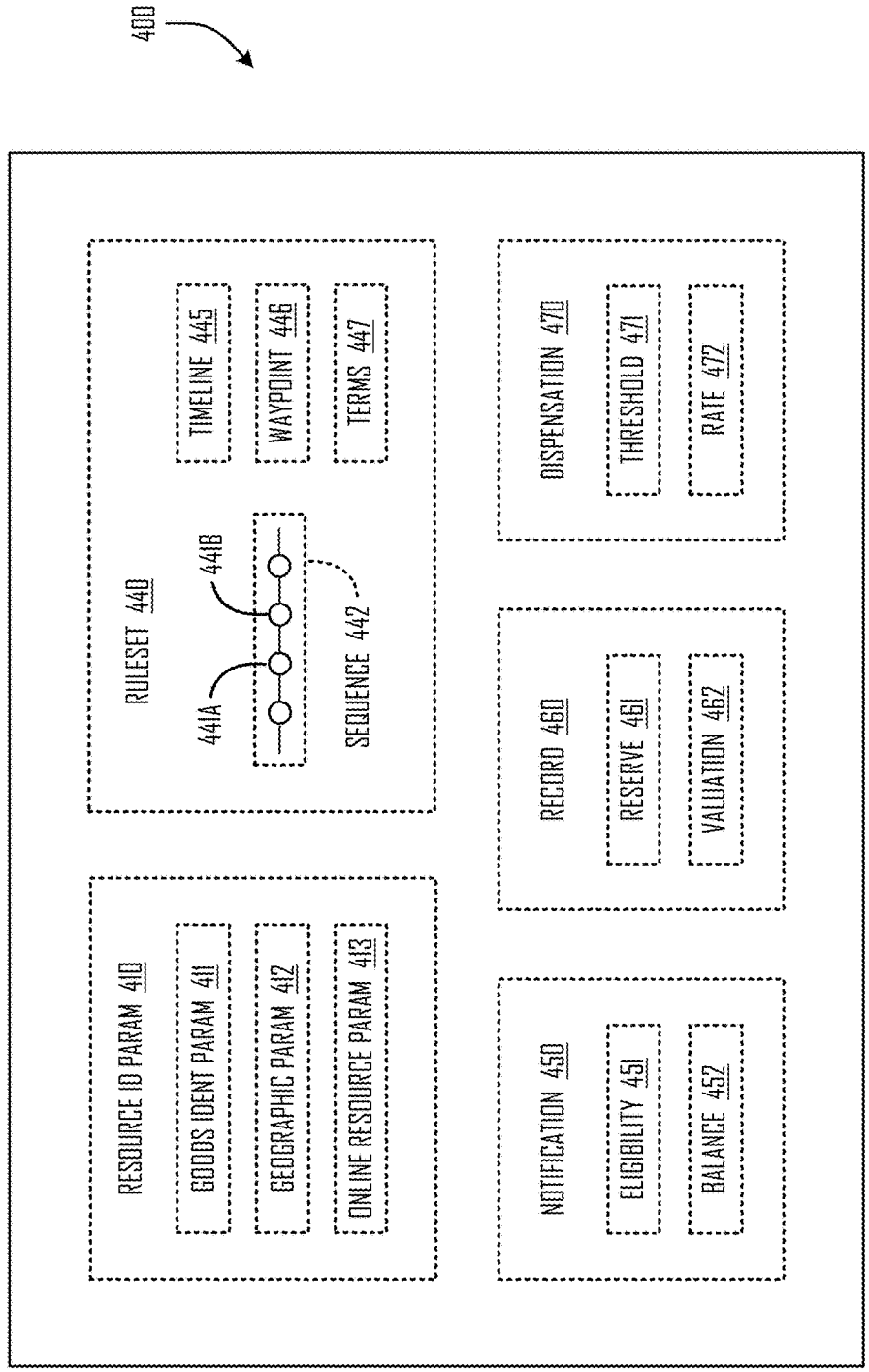
FIG. 4 depicts media-resident data objects in which one or more improved technologies may be incorporated.

FIG. 4 depicts one or more nonvolatile data storage media 400 configured to handle various data objects. These may include one or more instances of resource identification parameters 410 by which a party who performs one or more tasksets or an affiliate (campaign sponsor, e.g.) may specify one or more acceptable resources (as an individual item or category of items, e.g.) suitable for use as an incentive. In some instances such resources may be granular (generally requiring many days of labor or an equivalent expenditure to earn, e.g.). Such parameters may (optionally) include one or more instances of goods identification parameters 411, of geographic parameters 412, or of online resource parameters 413. Online resources may include a computing resource (processing capacity or access privileges, e.g.) or a cryptoasset (in denominations of "Bitcoins" or "Tokens" in the implementations described in the appendices below, e.g.), for example. Medium 400 may also include one or more ruleset sequences 442 or other tasksets 441A-B specified with relation to one or more instances of timelines 445, of waypoints 446, or of other task completion terms 447 (all specified by a sponsoring entity 110A when defining a campaign, e.g.). Medium 400 may also include one or more instances of eligibilities 451, of balances 452, or of other (aspects or components of) notifications 450. Medium 400 may also include one or more instances of reserves 461, of valuations 462, or of other (aspects or components of) records 460. Medium 400 may also include one or more instances of thresholds 471, of transfer/conversion rates 472, or of other (aspects or components of) dispensations 470.

Figure 5:
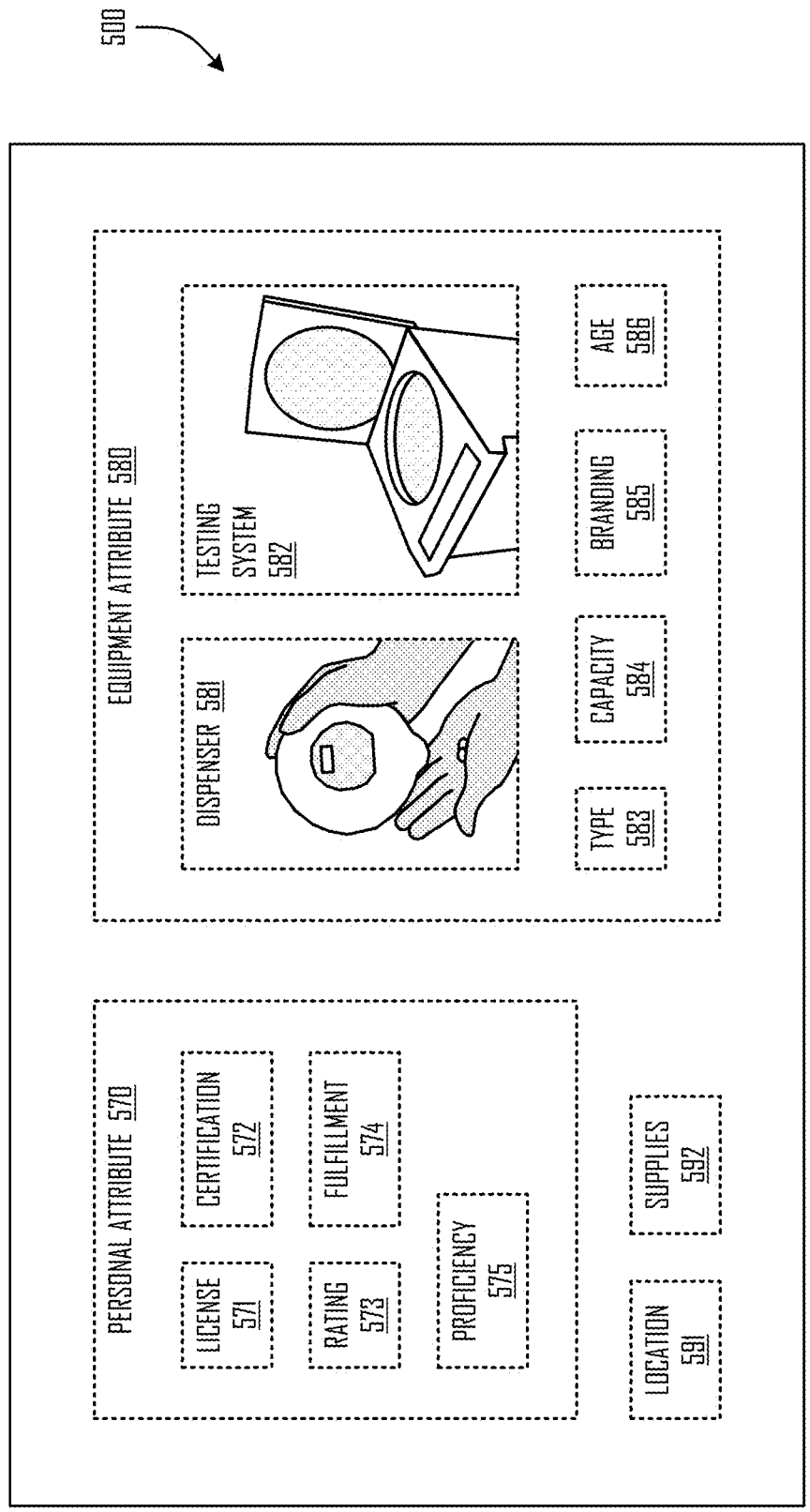
FIG. 5 depicts physical forms or other suitability indicia that demonstrate an ability or inclination of a party/participant to perform a task in which one or more improved technologies may be incorporated.

FIG. 5 depicts physical forms or other suitability indicia 500 that demonstrate an ability or inclination of a party to perform a task well and reliably. Such indicia may include one or more instances of licenses 571 or certification 572 (granted by a government within a jurisdiction for a limited period, e.g.); of ratings 573 (by peers, e.g.); of fulfillments 574 (of successful in-app transactions, e.g.); of other proficiencies (in multiple languages, e.g.); or of other such personal attributes 570 (awards or other accolades, e.g.) signifying suitability for facilitating a taskset completion. Such indicia may likewise include one or more instances of dispensers 581 (or other devices configured to monitor apparent health regimen compliance, e.g.); of testing systems 582 (or other specialty equipment able to perform scientific tasksets; of types 583 (of other specialty equipment, e.g.); of capacities 583 (indicative of surplus capacity at a facility at which tasksets are performed, e.g.); of branding 585 (trademarks or other indicia of corporate affiliation, e.g.); of equipment age 586; or of other such equipment attributes 580. Other such indicia may (optionally) designate one or more locations 591 (identified by a ZIP code, GPS coordinates, or service areas, e.g.) or supplies 592 available for performing the tasksets.

Figure 6:
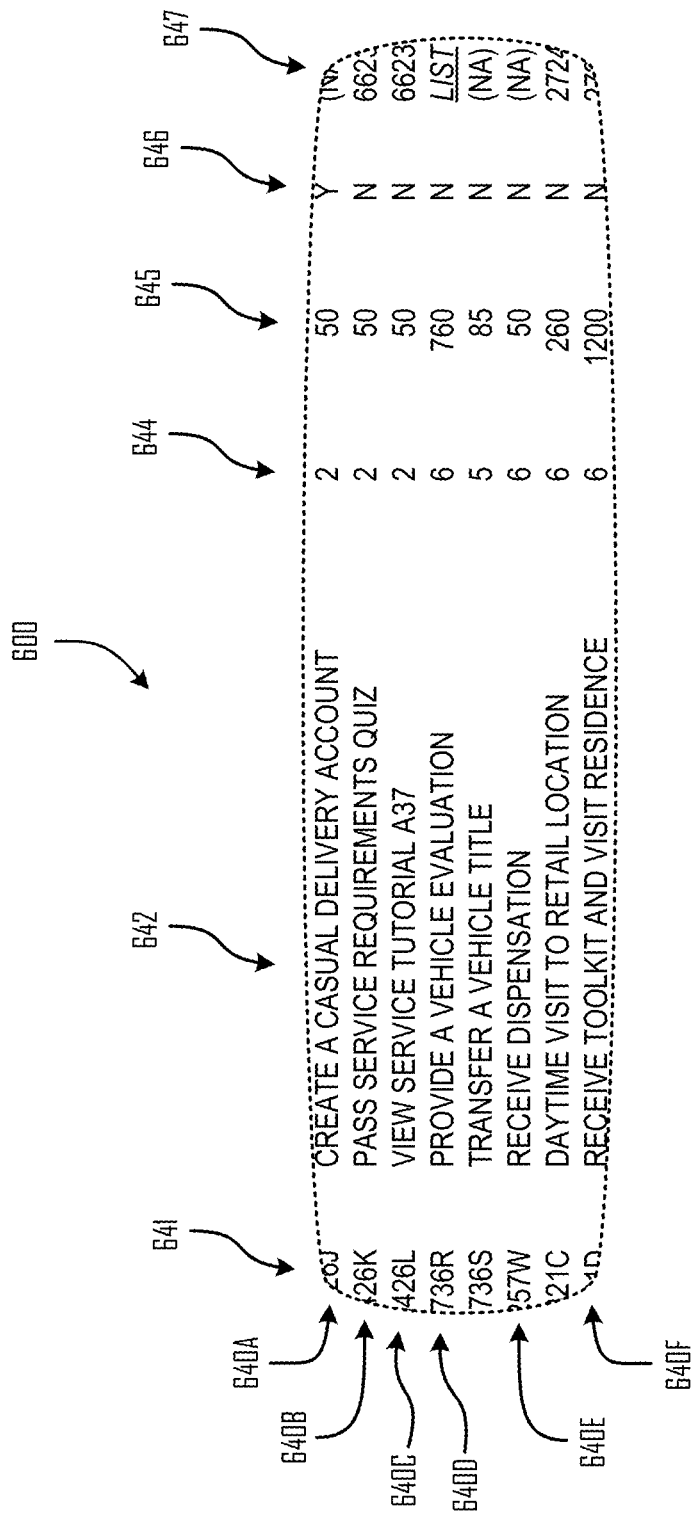
FIG. 6 depicts a list of records each describing a taskset in which one or more improved technologies may be incorporated.

FIG. 6 depicts a list 600 of records 640A-F each describing a taskset 441. Each record may include one or more instances of an alphanumeric taskset identifier 641, a taskset description 642, a taskset type 644, a task completion incentive 645 expressed as units of in-app currency ("Bolts" in the implementation described in the appendices below, e.g.), and a completion status 646. In the records 640 depicted, for example, a taskset type 644 of "2" signifies an online taskset and a taskset type 644 of "6" signifies an offline taskset. Each record may also include one or more prerequisite taskset identifiers 647 that each identify a taskset 441 the completion of which unlocks the described taskset. Record 640D signals a "LIST" of prerequisite tasksets (implemented as a hyperlink to the prerequisite taskset list, e.g.) for use when a taskset sequence 442 requires or allows more than one mode of unlocking the subject taskset. The list 600 for record 640D, for example, may include record 640B or record 640C (or both), according to the preferences of the sponsoring entity.

Figure 7:
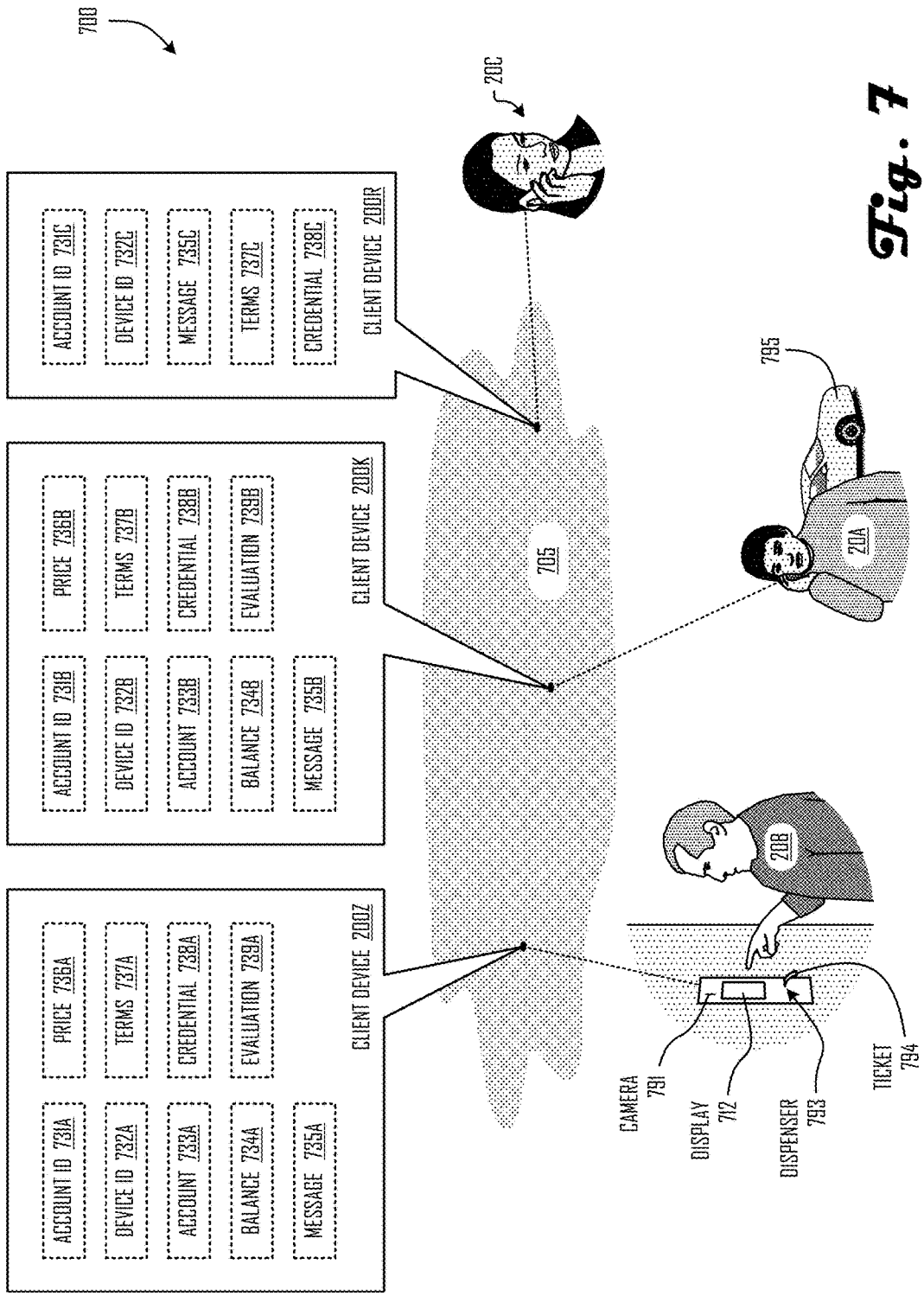
FIG. 7 depicts a system in which three client devices are located in a geographic region in which one or more improved technologies may be incorporated.

Various distributions of related data objects are likewise contemplated. FIG. 7 depicts a system 700 in which three client devices 200K, 200R, 200Z are located in a geographic region 705 (a city or ZIP code, e.g.). Client device 200K is a mobile device in use by a participant 20A seeking to sell his vehicle 795. Client device 200Z is a kiosk in use by a participant 20B seeking freelance work as a mechanic. As shown, client device 200Z has a display 712 (i.e. an instance of display hardware 212), a camera 791, and a dispenser 793 configured to print out tickets 794 as further described below.

In one scenario a first participant 20B may be notified of an opportunity (previously defined sponsored by participant 20A, e.g.) to earn and receive a first incentive 645 (of 50 units of in-app currency, e.g.) by completing a first taskset (having a taskset description 642 of "VIEW SERVICE TUTORIAL A37" as shown in record 640C, e.g.). This can occur, for example, in a context in which participant 20A wants a "PROVIDE A VEHICLE EVALUATION" performed by which potential buyers can be assured that the vehicle 795 has no discoverable latent flaws; in which such assurance will not result unless the service provider has and demonstrates appropriate credentials 738A (appropriate state licensure and an online rating, e.g.); in which the first incentive 645 is large enough to attract potential service providers 20B to overcome these barriers to entry (acquiring skills and building an online presence, e.g.); and in which potential service providers 20B would not otherwise bother to participate on a broad enough scale to justify such infrastructure (systems and methods as described below, e.g.). To assist in establishing such infrastructure, various client devices 200 may (optionally) be associated with one or more instances of account identifiers 731A-C (identifying a participant 20 using the device, e.g.); device identifiers 731A-C; accounts 733A-B (implementing a digital wallet 266 or similar mechanism to implement resource ownership, e.g.); balances 734 (of in-app currency, e.g.); messages 735A-C (providing notification as described herein, e.g.); prices 736A-B (as an incentive or other valuation described herein, e.g.); terms 737A-C (defining timing or location of performance, e.g.); credentials 738A-C (demonstrating trustworthiness, e.g.); or evaluations 739A-B.

Figure 8:
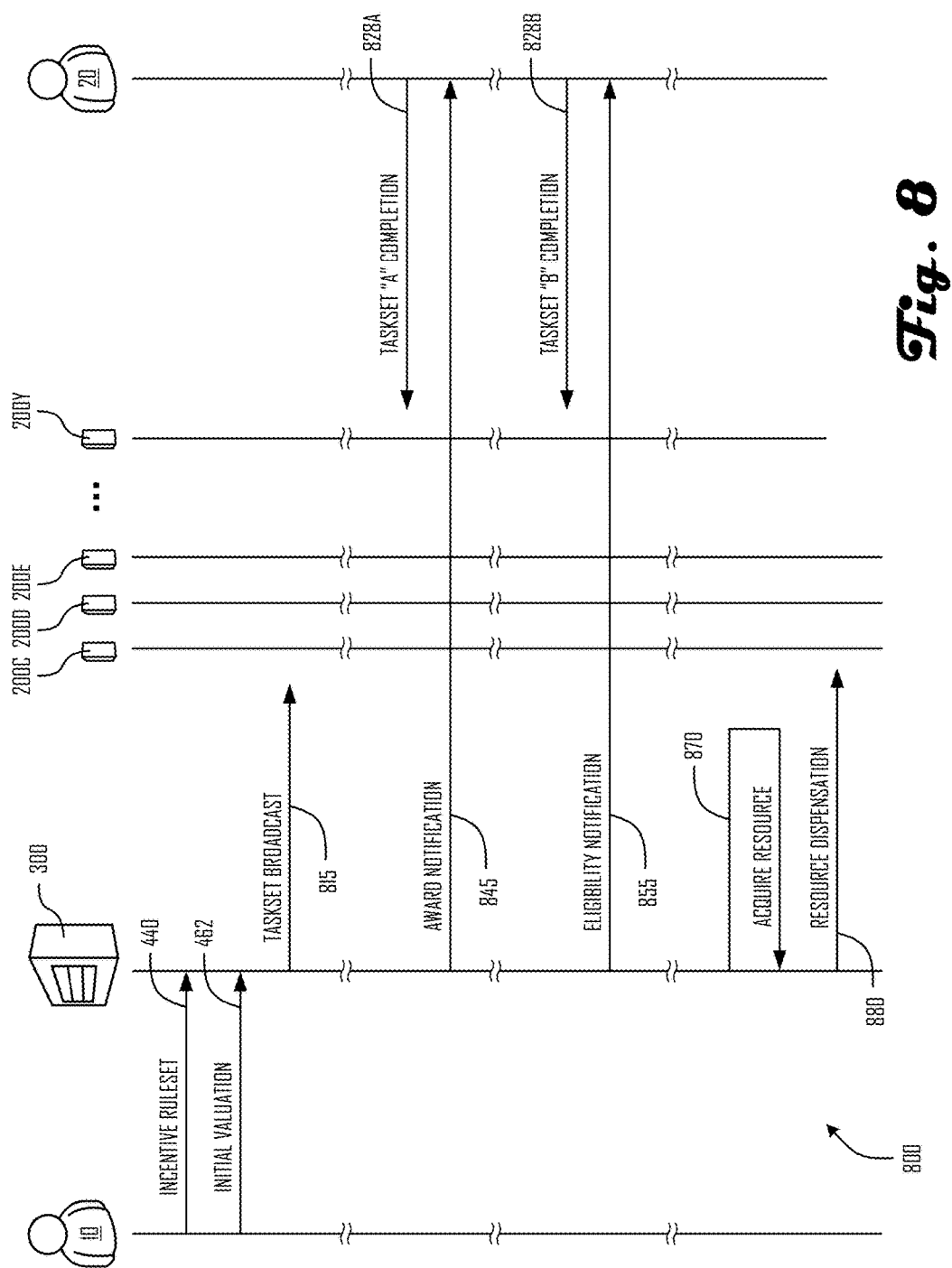
FIG. 8 depicts a particular scenario and progressive data flow in which one or more client devices and servers interact in which one or more improved technologies may be incorporated.

FIG. 8 depicts a particular scenario and progressive data flow 800 in which one or more client devices 200 and servers 300 (operably coupled via linkages 144 or via the Internet as shown in FIG. 1, e.g.) interact. After receiving campaign inception parameters (including an incentive ruleset 440 and initial valuation 462, e.g.) from a sponsoring client device 200A operated by affiliate 10, the one or more servers 300 initiate a taskset broadcast 815 to numerous party/member devices 200. A few hours later, one of the devices 200 (operated by participant 20) signals a taskset completion 828A (having reached a waypoint pertaining to one or more tasksets including taskset 441A, e.g.) signaling a reward. Server 300 responds (either to the completion 828A directly or to a crowdsourced verification of such completion from some other devices 200D-200Y, e.g.) by transmitting an award notification 845 (of a small increment of in-app currency, e.g.).

A few more hours later, the device 200 signals a further taskset completion 828B (having reached a subsequent waypoint unlocked by having completed taskset 441A, e.g.). Upon detecting that a completion of the subsequent taskset 441B qualifies the user of device 200B for an eligibility 451 (by virtue of a balance 452 of in-app currency crossing a threshold 471, e.g.), server 300 responds by transmitting an eligibility notification 855. In a context in which server 300 has received a dispensation authorization (implicit or explicit), server 300 then acquires or otherwise allocates the resource 870 and implements a resource dispensation 880

(either to the deserving user of device 200B directly or through a cryptoasset or other crowdsourced-verification-type transfer, e.g.).

Figure 9:
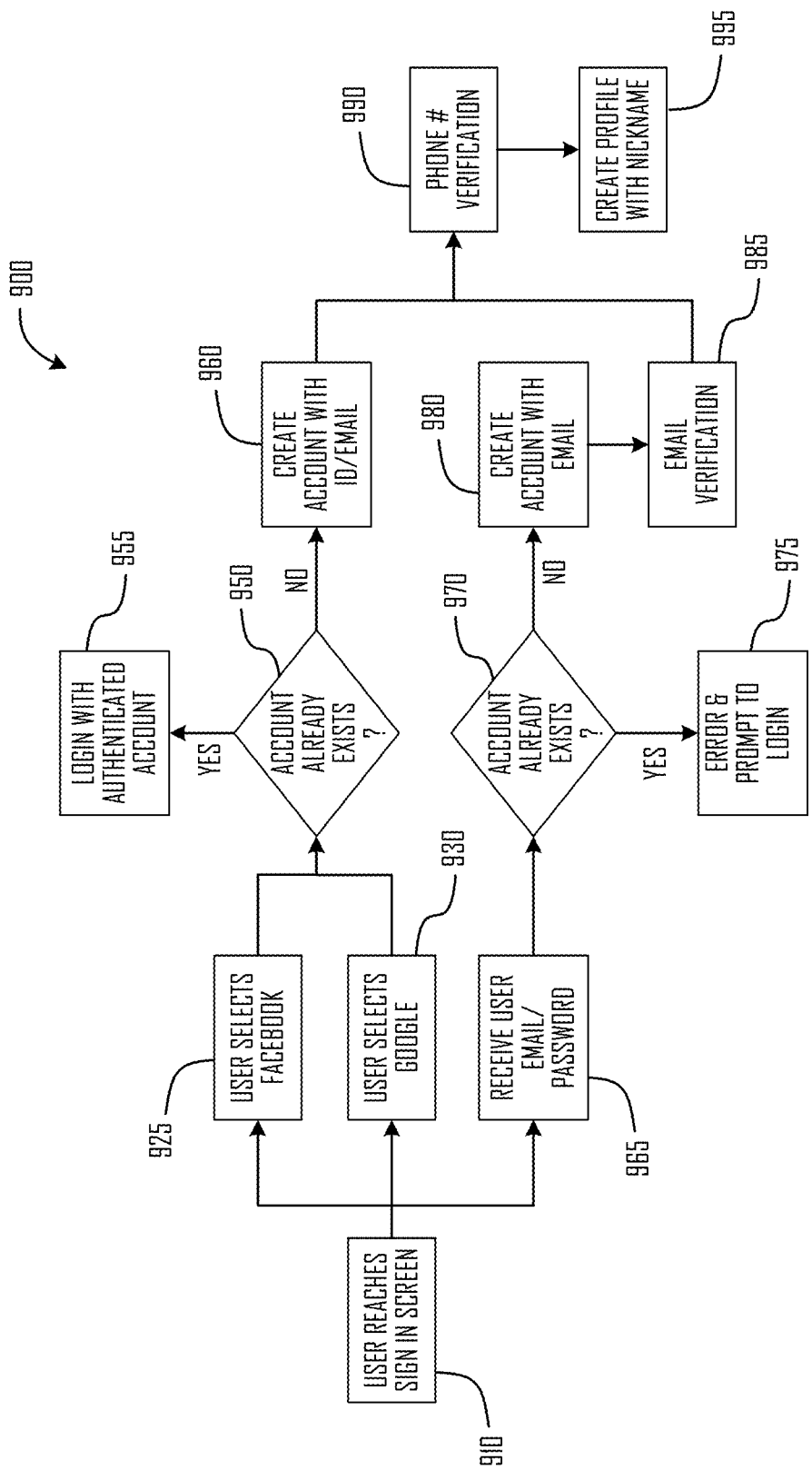
FIG. 9 depicts a participant sign up process flow in which one or more improved technologies may be incorporated.

FIG. 9 depicts a participant sign up process flow 900 performed primarily by one or more processing units 202, 302 in response to actions of client device users. At operation 910 a client device user (participant 20, e.g.) reaches an (app or browser) sign in screen. If a user selects Facebook® 925 or if a user selects Google®, flow proceeds to operation 950. Otherwise at operation 965 the user's email/password are received and flow proceeds to operation 970.

At operation 950 if a social media account already exists then at operation 955 a login is performed with the account. Otherwise an account is created with the user's account identifier or email address and flow proceeds to operation 990.

At operation 970 if an email account already exists then at operation 975 a login is performed with the account. Otherwise an account is created with the user's email address and (after email verification at operation 985 flow proceeds to operation 990.

At operation 990 a phone number verification is performed 990 and at operation 995 a profile is created, allowing the user to select a nickname.

Figure 10:
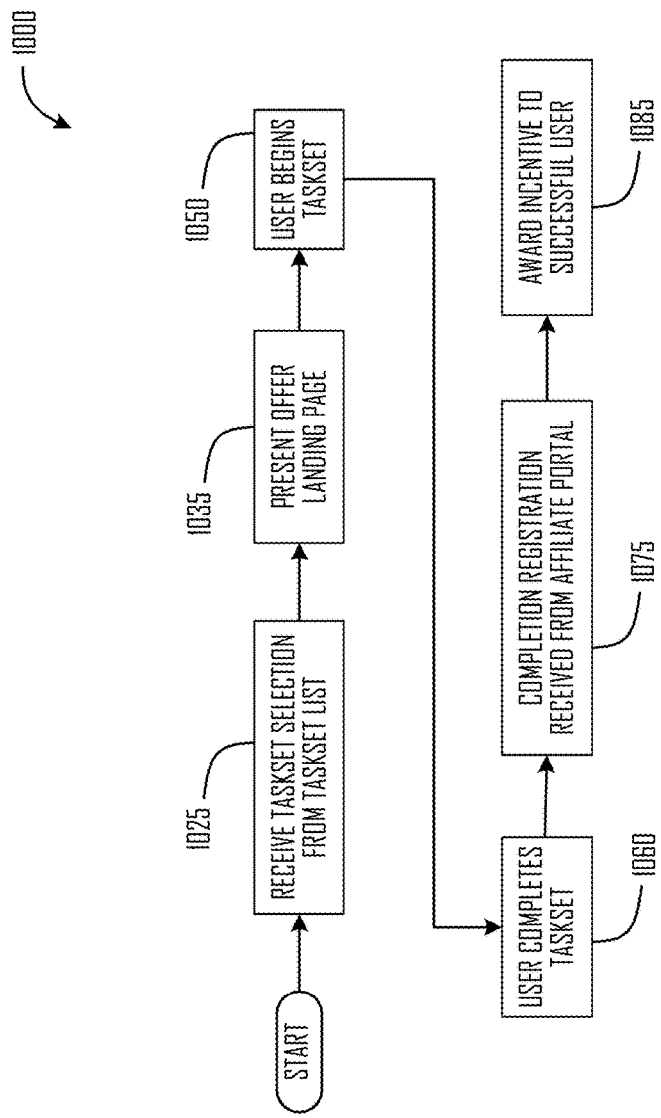
FIG. 10 depicts an incentive earning flow in which one or more improved technologies may be incorporated.

FIG. 10 depicts an incentive earning flow 1000 performed primarily by one or more processing units 202, 302 in response to actions of client device users. At operation 1025 a taskset selection (manifested as a taskset identifier 641, e.g.) is received from a client device 200 that has displayed a taskset list 600 (via which participant 20 signaled the taskset selection, e.g.). In response at operation 1035, an offer landing page is displayed via the client device 200, signaling a commencement of the user's performance of the selected taskset at operation 1050. Upon completion or in completion of the taskset at operation 1060, a proof of completion (corroboration, e.g.) is received such as by a completion registration being received from an affiliate portal at operation 1075.

Figure 11:
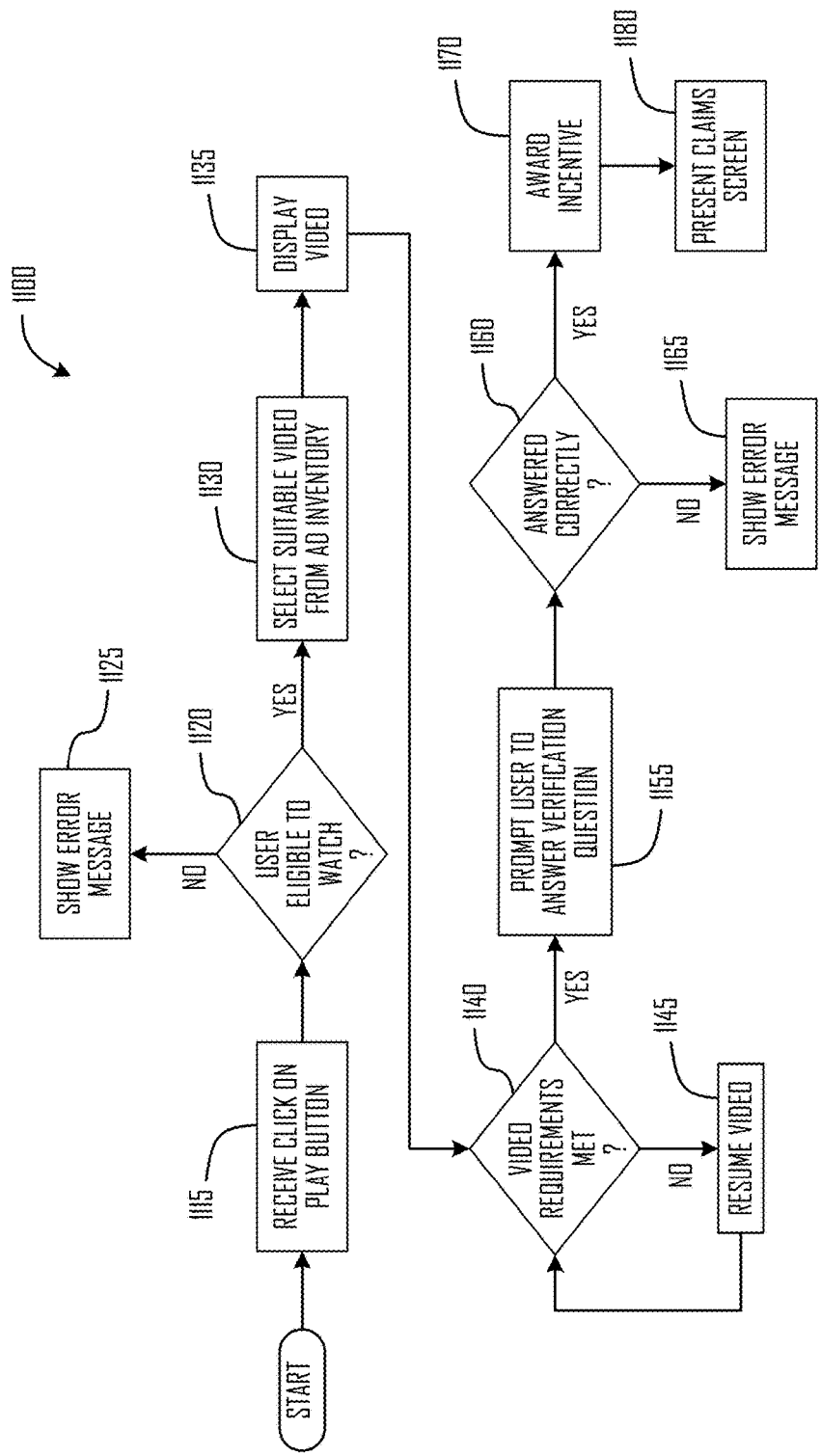
FIG. 11 depicts another incentive earning flow in which one or more improved technologies may be incorporated.

FIG. 11 depicts another incentive earning flow 1100 performed primarily by one or more processing units 202, 302 in response to actions of client device users. At operation 1115 an activation of a user control or other triggering event (a click on a play button, e.g.) is detected. If at operation 1120 a user (participant 20, e.g.) is deemed ineligible to receive compensation for a taskset that includes watching an advertisement (based on user age or a history of prior online actions, e.g.), an error message is shown 1125 and flow 1100 concludes. Otherwise at operation 1130 a suitable video is selected (from an ad inventory, e.g.) and at operation 1135 it is displayed.

If at operation 1140 one or more video requirements (watching enough of the video as defined by a sponsoring entity 110A, e.g.) are not met then the video is resumed at operation 1145 until the one or more requirements are met (or an abort event is detected).

If the one or more requirements are met at operation 1140, the user is prompted to answer one or more verification questions at operation 1155. If an insufficient number or fraction of answers are deemed incorrect at operation 1160, an error message is shown at operation 1165 and flow 1100 concludes. Otherwise at operation 1170 the incentive 645 is awarded and at operation 1180 a claims screen is presented (confirming the award and presenting, if appropriate, any dispensation eligibilities or just-unlocked tasksets, e.g.).

Figure 12:
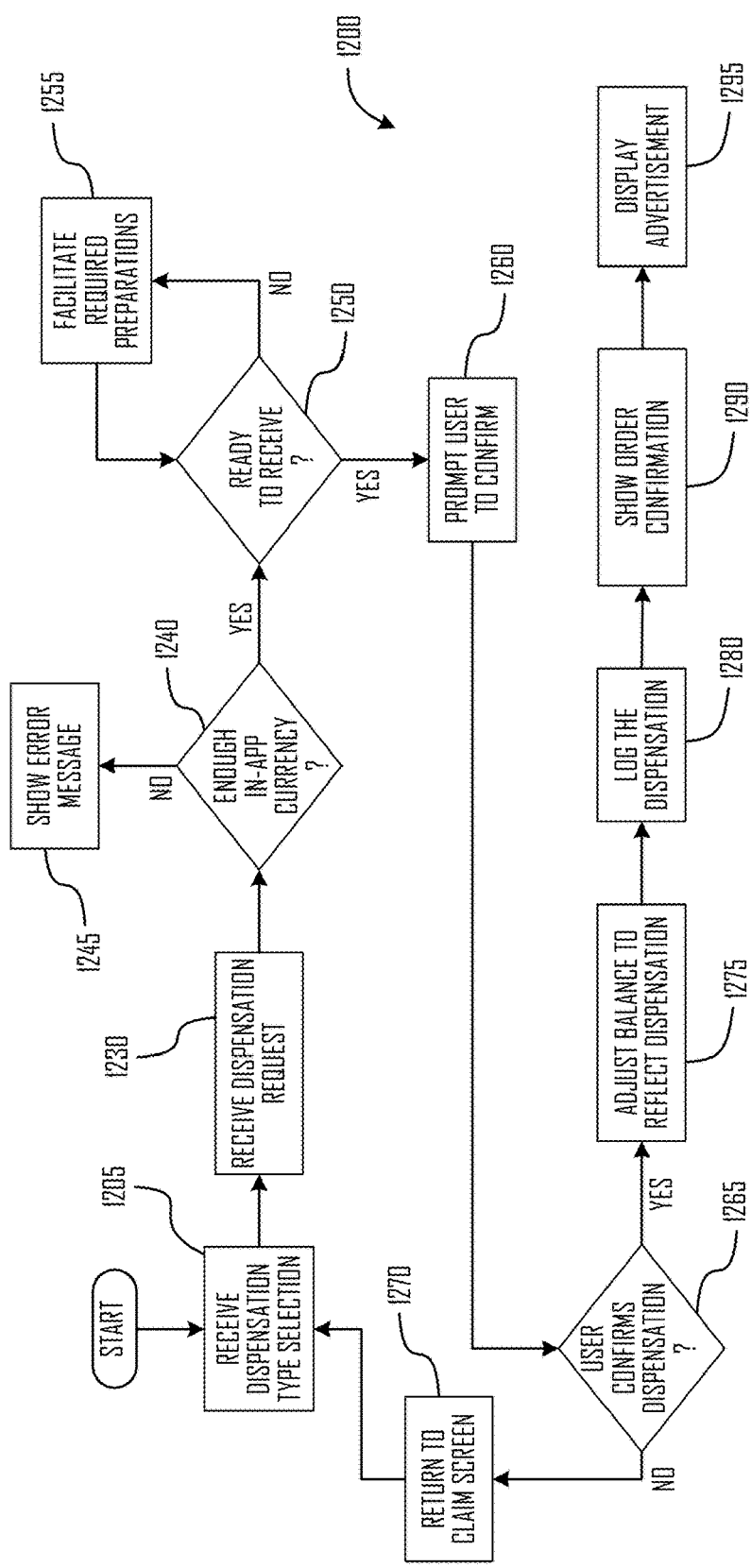
FIG. 12 depicts a dispensation flow in which one or more improved technologies may be incorporated.

FIG. 12 depicts a dispensation flow 1200 performed primarily by one or more processing units 202, 302 in response to actions of client device users. At operation 1205 a dispensation type selection is received. For example such selection can include (as a component of participant sign up process flow 900, e.g.) a designation of one or more user-preferred physical goods, one or more online resources (cryptocurrencies, e.g.), prize valuation parameters (a minimum and maximum signaling a range of suitable valuations, e.g.), or combinations of such parameters upon which subsequent eligibility notifications 855 will be based.

A dispensation request for one or more selected prizes is received at operation 1230 and a determination is made at operation 1240 whether enough in-app currency is available to implement the dispensation. If not, at operation 1245 an error message is shown. Otherwise a determination is made at operation 1250 whether the recipient (participant 20, e.g.) is ready to receive the dispensation (i.e. whether any required preparations are not yet complete). If not then at operation 1255 any incomplete tasks required for the dispensation are facilitated (by prompting for a registration of a digital wallet in preparation to receive an initial denomination of a cryptoasset, e.g.) and operation 1250 is repeated.

Once a determination is made that required preparations are complete and the dispensation can occur, at operation 1260 the user is prompted to confirm the dispensation. If the confirmation is not provided, at operation 1270 control is returned to the claims screen (confirming an award of in-app currency or repeating operation 1205, e.g.). Otherwise the balance is adjusted at 1275 (adjusting a balance 734 of the client device 200, e.g.) to reflect the dispensation at operation 1275 and the dispensation is logged at operation 1280. Moreover where appropriate the order is confirmed at operation 1290 and a suitable advertisement is shown 1295 via the client device (promoting a next taskset of possible interest to the user, e.g.).

FIG. 13 depicts an affiliate enlistment flow 1300 performed primarily by one or more processing units 202, 302 in response to actions of client device users (affiliates 10, e.g.). At operation 1325 an account is created on an affiliate site. At operation 1335 affiliate account manager training materials are provided or otherwise facilitated. At operation 1345 affiliate onboarding is conducted. At operation 1365 one or more Universal Record Locator (URL) hoods and macros are verified. At operation 1375 one or more operating parameters (campaign valuations and taskset definitions, e.g.) are received. At operation 1385 affiliate offers (manifested as records 640, e.g.) are added to taskset incentive lists.

Figure 14:
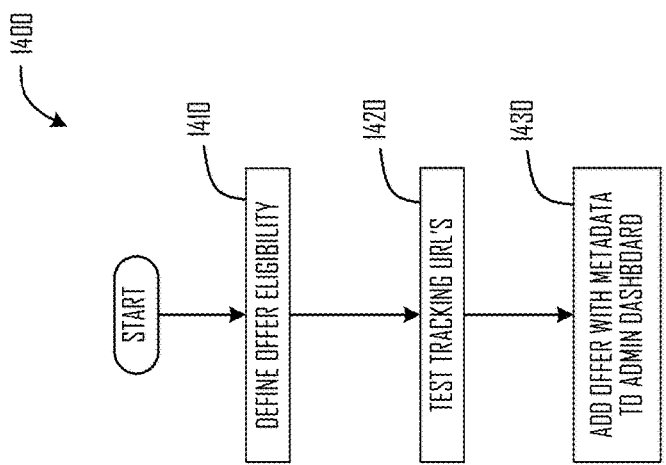
FIG. 14 depicts an offer addition flow in which one or more improved technologies may be incorporated.

FIG. 14 depicts an offer addition flow 1400 performed primarily by one or more processing units 202, 302 in response to actions of client device users (affiliates 10 or other participants 20 who sponsor taskset completions, e.g.). At operation 1410 offer eligibilities (if any) are defined for each taskset 441. At operation 1420 tracking URL's are (configured and) tested. And at operation 1430 one or more offers with metadata (defining taskset parameters and relationships, e.g.) are added (via an admin dashboard, e.g.).

Figure 15:
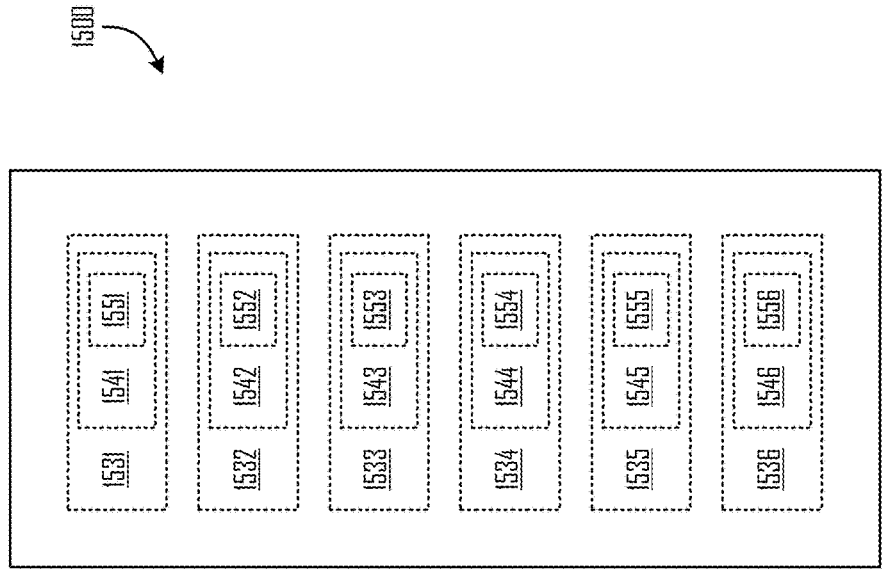
FIG. 15 depicts special-purpose transistor-based circuitry in which one or more improved technologies may be incorporated.

FIG. 15 depicts special-purpose transistor-based circuitry 1500—optionally implemented as an Application-Specific Integrated Circuit (ASIC) or in a UI governance server, e.g.—in which some or all of the functional modules described below may be implemented. Transistor-based circuitry 1500 is an event-sequencing structure generally as described in U.S. Pat. Pub. No. 20150094046 but configured as described herein. Transistor-based circuitry 1500 includes one or more instances of notification modules 1531, for example, each including an electrical node set 1541 upon which informational data is represented digitally as a corresponding voltage configuration 1551.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any records or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Transistor-based circuitry 1500 likewise includes one or more instances of detection modules 1532 each including an electrical node set 1542 upon which informational data is represented digitally as a corresponding voltage configuration 1552. Transistor-based circuitry 1500 likewise includes one or more instances of notification modules 1533 each including an electrical node set 1543 upon which informational data is represented digitally as a corresponding voltage configuration 1553. Transistor-based circuitry 1500 likewise includes one or more instances of notification modules 1534 each including an electrical node set 1544 upon which informational data is represented digitally as a corresponding voltage configuration 1554. Transistor-based circuitry 1500 likewise includes one or more instances of detection modules 1535 each including an electrical node set 1545 upon which informational data is represented digitally as a corresponding voltage configuration 1555. Transistor-based circuitry 1500 likewise includes one or more instances of dispensation modules 1536 each including an electrical node set 1546 upon which informational data is represented digitally as a corresponding voltage configuration 1556. In some variants, as described below in the clauses and claims, such a module implements such functionality jointly (in conjunction with other modules or processing units 302 described herein, e.g.). Alternatively or additionally, in some variants such modules (or components thereof) may be distributed (so that some are implemented in special-purpose circuitry 322 of respective servers 300, e.g.).

FIG. 1600 illustrates an operational flow 1600 (implemented in software as a routine executed or coordinated by one or more instances of processing unit 302, e.g.) suitable for use with at least one embodiment, such as may be performed (in some variants) on a server 300 using special-purpose circuitry 322 (via a process flow management service thereof, e.g.). As will be recognized by those having ordinary skill in the art, not all events of information management are illustrated in FIG. 16. Rather, for clarity, only those steps reasonably relevant to describing the tabular data modification aspects of flow 1600 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 1610 describes notifying a first party of an opportunity to earn a first incentive by completing a first online taskset (a notification module 1531 transmitting a taskset broadcast 815 or otherwise inviting participant 20B to receive an in-app currency or in-kind resource by completing a first online taskset 441, e.g.). This can occur, for example, in a context in which the online taskset includes viewing a tutorial video or passing a quiz (as shown in records 640B-C, e.g.), in which the invitation is expressed (in a broadcast message, e.g.) as a voltage configuration 1551 on an electrical node set 1541 of the notification module 1531, and in which the in-kind asset is identified by a goods identification parameter 411 or other resource identification parameter 410.

Operation 1625 describes allowing the first party to earn the first incentive by completing the first online taskset (a detection module 1532 responding to an online reporting of participant 20B having completed the first online taskset 441, e.g.). This can occur, for example, in a context in which the detection module 1532 detects a successful completion of the taskset manifested by one or more correct answers being given (in a timed structured dialog question response implementing operation 1160, e.g.) by participant 20B via client device 200Z and in which the successful completion is expressed as a Boolean-valued voltage configuration 1552 on an electrical node set 1542 of the detection module 1532. Alternatively or additionally, such completion may comprise being observed (via camera 791, e.g.) by entity 110A or corroborated via one or more other participant-provided client devices 200K as a component.

Operation 1640 describes notifying the first party of having received the first incentive in lieu of signaling any immediate eligibility for any in-kind dispensation as a conditional response partly based on the first party having completed the first online taskset and partly based on an aggregated amount that includes the first incentive being smaller than a first threshold (a notification module 1533 informing participant 20B of his account 733A having received 50 units of in-app currency without indicating any non-cash mode of dispensation having become available, e.g.). This can occur, for example, in a context in which the first incentive is merely incremental (insufficient to bring balance 734A above a dispensation threshold 471, e.g.); in which notification module 1533 is configured not to provide such notification except as a conditional, contemporaneous response to balance 734A becoming large enough to allow a dispensation consistent with one or more preferred types of incentive previously designated as "preferred" by participant 20B, e.g.); in which the first incentive of (the present instance of) operation 1640 does not trigger any new dispensation eligibilities (of which participant 20B has yet to be notified, e.g.), and in which the comparison result of "being smaller" is expressed as a voltage configuration 1553 on an electrical node set 1543 of the notification module 1533.

Operation 1650 describes notifying the first party of an opportunity to earn a second incentive by completing a first offline taskset (a notification module 1534 inviting participant 20B to take advantage of a now-unlocked opportunity to earn an additional amount of in-app currency by completing a now-unlocked offline taskset 441, e.g.). This can occur, for example, in a context in which the now-unlocked offline taskset includes a taskset with a description 642 of "PROVIDE A VEHICLE EVALUATION," in which the invitation is expressed as a voltage configuration 1554 on an electrical node set 1544 of the notification module 1534, in which the first offline taskset builds upon the first online taskset as a succession of waypoints (an instance of sequence 442 such that one of the prerequisite tasksets 441A precedes at least one of the now-unlocked offline tasksets 441B and directly or otherwise causes the latter to become unlocked, e.g.), and in which appropriately skilled parties could not otherwise be found promptly (when needed) within a remote region 705. In some variants, for example, a record 640D that defines the first offline taskset specifies one or more prerequisite tasksets 647 that include the "first" online taskset. In some such contexts, operation 1650 can allow qualified contractors (reliably impartial expert service providers, e.g.) in a region 705 to be recruited or developed from afar (by an overseas participant 20 wanting to buy a reliable vehicle 795 "sight unseen" on behalf of a participant 20C who is his sister, e.g.) while incurring near-zero transportation and training costs.

Operation 1660 describes allowing the first party to earn the second incentive by completing the first offline taskset (a detection module 1535 determining that participant 20B is eligible for and has earned the second incentive and thereby become eligible to receive an in-kind dispensation 470 that he wanted, e.g.). This can occur, for example, in a context in which participant 20B has previously identified a class of dispensations that include the in-kind dispensation 470; in which the in-kind dispensation 470 is now affordable (at least partly) because the first and second incentives 645 are together at least equal to the first threshold 471 (as well as any in-app currency transaction costs incurred by the dispensation); in which notification module 1534 has notified participant 20B as a conditional response to the eligibility for the in-kind dispensation 470; and in which the comparison result is expressed as a voltage configuration 1555 on an electrical node set 1545 of the notification module 1535.

Operation 1675 describes implementing the in-kind dispensation associated with the aggregated amount that includes the first and second incentives as a conditional response to a dispensation request from the first party (a dispensation module 1536 triggering the in-kind dispensation associated with the aggregated amount that includes at least the first and second incentives as a conditional response to a dispensation request from participant 20B, e.g.). This can occur, for example, in a context in which a final authorization is solicited and received from participant 20B shortly before the in-kind dispensation; in which current cost or availability of the item(s) to be dispensed is thereafter confirmed; and in which a mode of compensation that specifies a form or destination of dispensation is expressed as a voltage configuration 1556 on an electrical node set 1546 of the dispensation module 1536. In some contexts, for example, dispensation module 1536 may perform operation 1675 by dispensing one or more tickets 794 (for admission or redemption as a component of the in-kind dispensation, e.g.) to participant 20B via client device 200Z.

FIG. 17 illustrates an operational flow 1700 in which one or more technologies may be implemented (within or in conjunction with special-purpose circuitry 322, e.g.). Operation 1720 describes associating a campaign reserve 461 of in-app currency with a campaign sponsor (entity 110A, e.g.), wherein the campaign reserve has an initial valuation 462. Operation 1730 describes obtaining an incentive ruleset 440 from the campaign sponsor specifying how the in-app currency can be earned from the campaign reserve by performing one or more incentive-eligible tasksets 441 (according to a timeline 445 and other required terms 447, e.g.).

Operation 1745 describes notifying a population (of members or other participants, e.g.) that they can earn a resource (identifying a target cryptoasset, e.g.) by performing the incentive-eligible tasksets 441 according to the sponsor's incentive ruleset 440 without promising them how much of the commodity they can earn by performing tasksets according to the sponsor's incentive ruleset. Operation 1755 describes establishing one or more payout or exchange rates 472 (between the in-app currency and the commodity, e.g.) at least partly based upon the initial valuation 462 after one or more participants of the population have earned respective allocations of the in-app currency from the campaign reserve by performing at least some of the incentive-eligible tasksets 441 according to the sponsor's incentive ruleset 440.

Operation 1770 describes transferring commodity dispensations respectively to members of the population by implementing the first exchange rate from the in-app currency to the commodity (in response to a request or other authorization, e.g.). This may occur, for example, in a context in which no systematic payout in a particular target commodity would otherwise be feasible (because of the small values earned in each of the tasksets 441A-B, e.g.).

In some variants of the foregoing, as further described below, a task-category-specific reputation level or other qualification may control which participants/users are notified of or otherwise eligible to perform tasksets. Alternatively or additionally, such task-category-specific qualifications (skills, e.g.) may improve as an automatic and conditional response to a successful completion of tasksets (of education or training certification, e.g.). In some variants, for example, a taskset thereby unlocked may include one or more freelance product development tasks (crowdsourced QA testing or machine learning facilitation, e.g.) performed via one or more mobile devices 200B-Y.

Likewise in some variants of the foregoing, as further described below, a task-category-specific qualification of a user may reflect a (predicted or actual) user-specific purchase volume in a product or service category (sportswear, e.g.) related to an advertisement. This can occur, for example, in a context in which the tasksets 441 include allowing the advertisement to be presented via the mobile device 200B or otherwise opting in to the advertisement and in which the advertisement would not otherwise be effective.

In some variants of the foregoing, as further described below, a task-category-specific reputation level or other qualification may control which parties/users are notified of or otherwise eligible to perform tasksets. Alternatively or additionally, such task-category-specific qualifications (skills, e.g.) may improve as an automatic and conditional response to a successful completion of tasksets (of education or training certification, e.g.). In some variants, for example, a taskset thereby unlocked may include one or more freelance product development tasks (crowdsourced QA testing or machine learning facilitation, e.g.) performed via one or more mobile devices 200B-Y.

Likewise in some variants of the foregoing, as further described below, a task-category-specific qualification of a user may reflect a (predicted or actual) user-specific purchase volume in a product or service category (sportswear, e.g.) related to an advertisement. This can occur, for example, in a context in which the tasksets 441 include allowing the advertisement to be presented via the mobile device 200B or otherwise opting in to the advertisement and in which the advertisement would not otherwise be effective.

Figure 18:
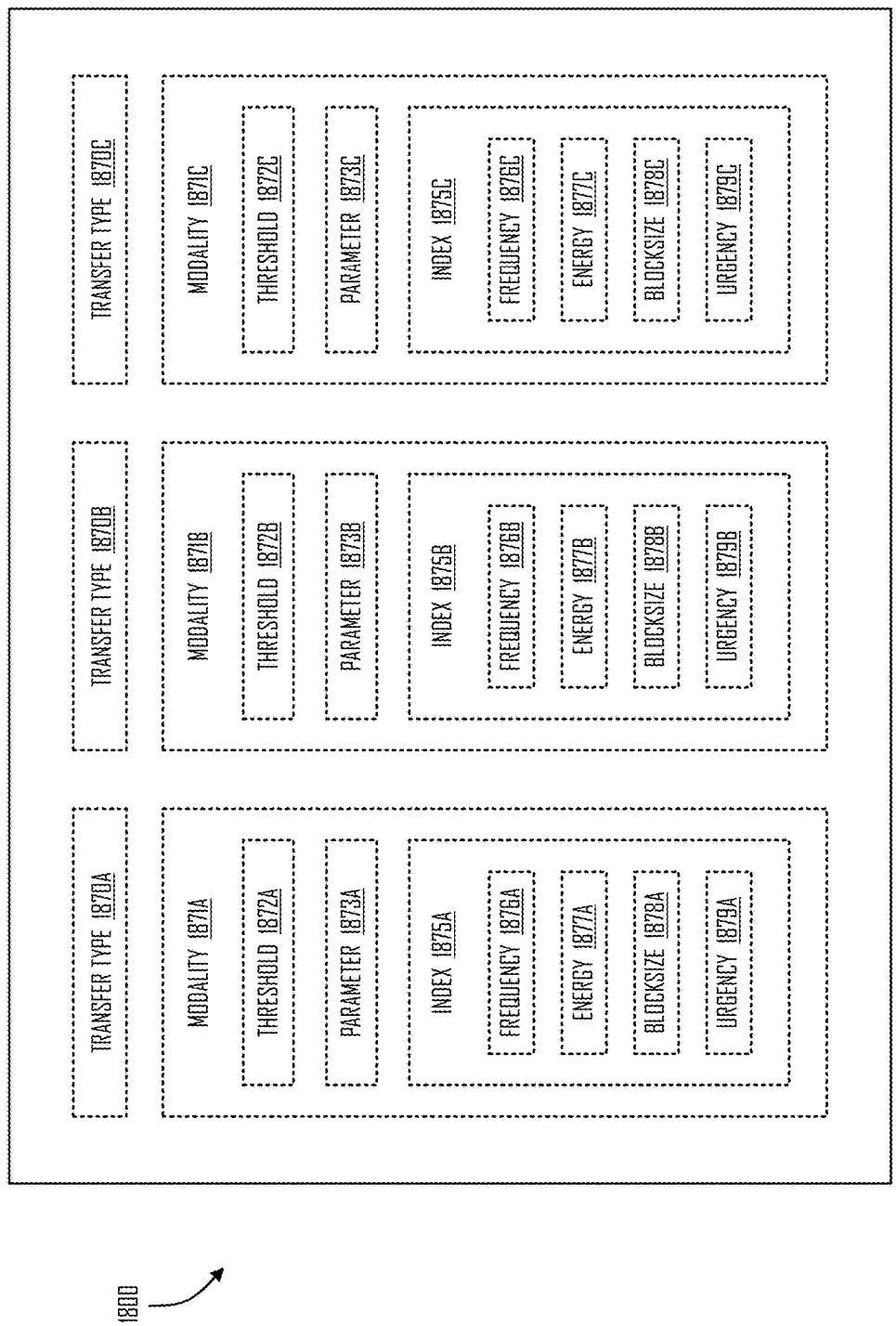
FIG. 18 depicts one or more nonvolatile data storage media configured to handle various data objects in which one or more improved technologies may be incorporated.

FIG. 18 depicts one or more nonvolatile data storage media 1800 configured to handle various data objects in which one or more improved technologies may be incorporated. These may include one or more instances of transfer types 1870A-C each corresponding to one or more corresponding modalities 1871A-C. Each such modality as shown may include one or more instances of corresponding thresholds 1872A-C, parameters 1873A-C, and indexes 1875A-C. Each such threshold will be governed by the requirements of a shared platform (protocol and campaign parameters, e.g.) and in some instances by preferences of a sponsoring entity as described herein. Such indexes (describing a complexity or other quantification of a token, e.g.) may, in some variants, include one or more (instances of) frequencies 1876A-C, of energies 1877A-C, of blocksizes 1878A-C, or of urgencies 1879A-C. For a modality 1871 including energy tokens, for example, an appropriate index 1875 may be expressed in kilowatt hours. For a modality 1871 including computer-related resource tokens (for processing or transmission, e.g.), also, an appropriate index 1875 may be expressed as "high" or "low" urgency 1879 or as a scalar (a rate or a number of bytes, e.g.). In light of teachings herein those skilled in the art will be able to designate suitable values for all such parameters without any undue experimentation.

Figure 19:
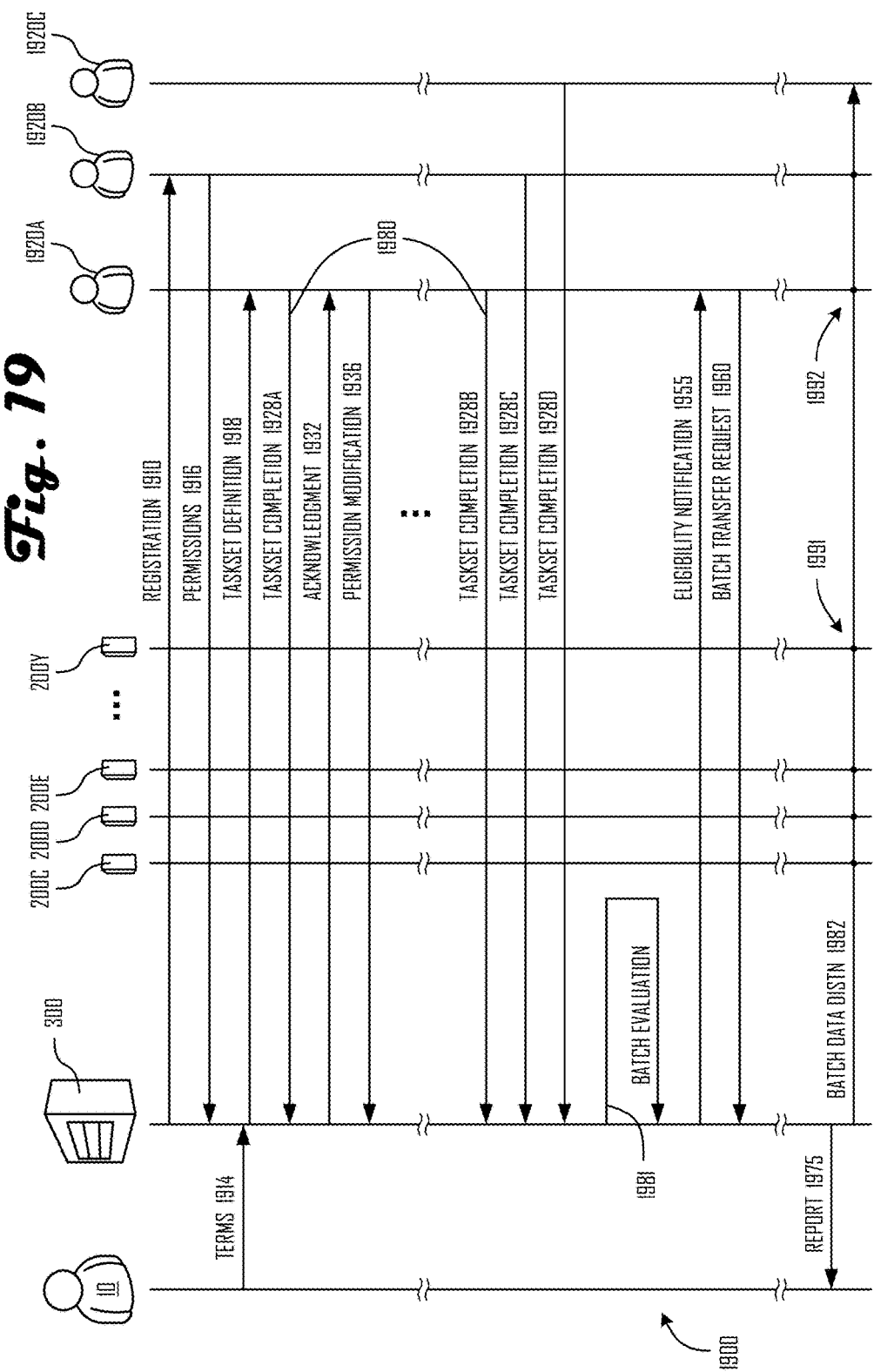
FIG. 19 depicts a particular scenario and progressive data flow in which one or more client devices and servers interact in which one or more improved technologies may be incorporated.

FIG. 19 depicts a particular scenario and progressive data flow 1900 in which one or more client devices 200 and servers 300 (operably coupled via linkages 144 or via the Internet as shown in FIG. 1, e.g.) interact. Additional participants 1920 perform tasksets as described above using additional (instances of) client devices 200 initially to receive registrations 1910 (upon initial engagement, e.g.) and send permissions 1916 that govern later participation. In light of the participant base and many other factors, an affiliate 10 sets terms 1914 (of a campaign of tasksets as described herein, e.g.) and server accordingly solicits one or more qualifying participants 1920A (one meeting geographic and other preliminary eligibility criteria set forth in the terms 1914, e.g.). It will be understood that entities who perform tasksets (called "participants" herein) each have one or more client devices 200 with a digital wallet (as a removable security feature 260, e.g.) or other special purpose circuitry 222 described herein.

A new participant 1920A joins established participants 1920B-C and receives and acts upon a taskset definition 1918 (including an alphanumeric taskset description 642 and other parameters exemplified in records 640A-F of FIG. 6, e.g.). Participant 1920A thereafter reports a corresponding taskset completion 1928A. Server 300 responds with an off-chain acknowledgment 1932 (optionally as an instance of operation 1640, e.g.), one that does not signal any immediate eligibility for any in-kind dispensation (insofar that the aggregated balance 452 that includes the incentive remains below threshold 471, e.g.). After one or more such less-consequential acknowledgements 1932, participant 1920A elects a permission modification 1936 to allow one or more additional/substitute distribution modalities 1871B. After several additional taskset completions 1928B-D are reported to the one or more servers 300, a batch evaluation 1981 determines that an aggregate performance 1980 by one or more participants 1920 is sufficient to warrant an eligibility notification 1955 as an automatic and conditional response to recipient participants 1920A becoming eligible to participate in one or more modalities 1871B of upcoming batch data distributions. In response, many such participants 1920A (in a population of hundreds or more, e.g.) submit a batch transfer request 1980 or otherwise signal a willingness to participate in the upcoming batch data distribution 1982. In some variants, this implements simultaneous transfers 1992 to eligible participants who have signaled such willingness roughly contemporaneously with a report 1975 of such distribution to a sponsoring affiliate 10. In the case of blockchain (miners, e.g.) and similar crowdsource validations, moreover, batch data distribution 1982 may include transfers to numerous block validation devices 1991. In some variants such transfers may include blockchain content (physical object provenance or other event-indicative records strewn through a series of blocks in which each block includes a cryptographic hash of older data, e.g.). Alternatively or additionally, some such content may include one or more snippets of device-executable code (a smart contract that can later be executed once activated by a suitable cryptoasset, e.g.).

Figure 20:
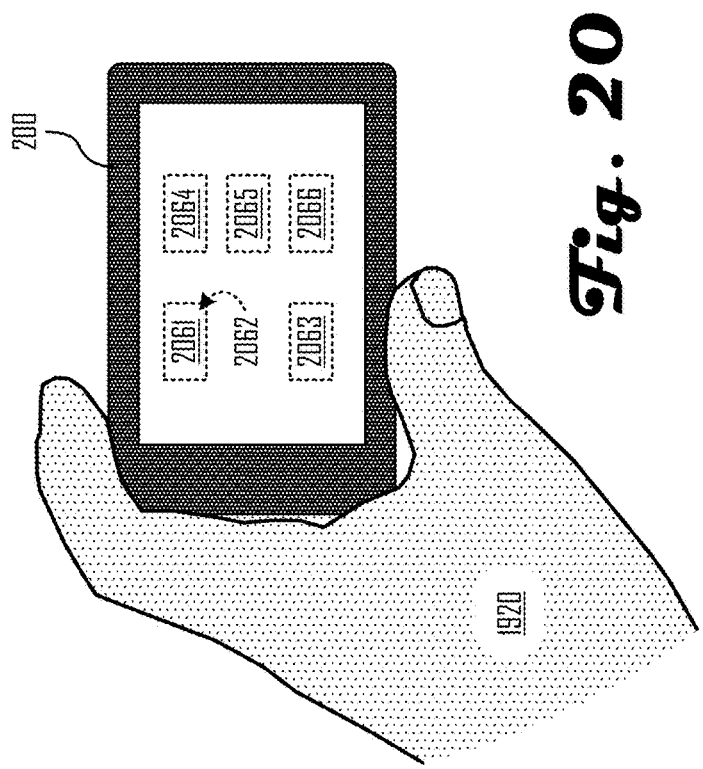
FIG. 20 depicts a handheld client device in use by a participant in which one or more improved technologies may be incorporated.

FIG. 20 depicts a handheld client device 200 in use by a participant. Display hardware 212 presents one or more (instances of) account settings 2061 (having a default value 2062 or participant-set value, e.g.); of user-actionable eligibility notification controls 2063 (for suspending or causing inclusion in a future eligibility notification, e.g.); of preferences 2064; of scores 2065 (for completing a taskset, e.g.); or of user-actionable batch distribution controls 2066 (for suspending or causing inclusion in a batch distribution, e.g.). Such items may be presented to or received from users in relation to any of FIGS. 10-14, for example.

Figure 21:
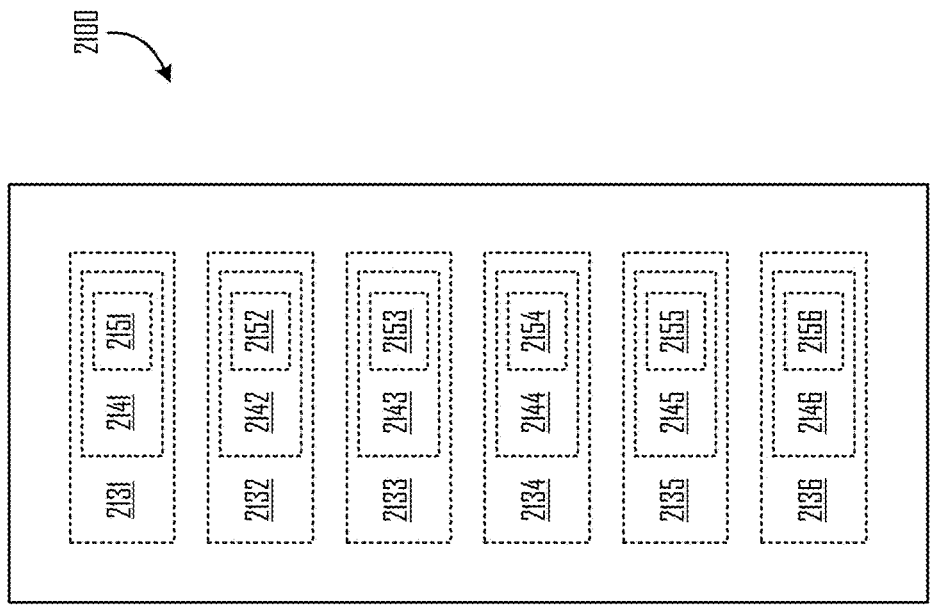
FIG. 21 depicts special-purpose transistor-based circuitry in which one or more improved technologies may be incorporated.

FIG. 21 depicts special-purpose transistor-based circuitry 2100—optionally implemented as an ASIC or in a UI governance server, e.g.—in which some or all of the functional modules described below may be implemented. Transistor-based circuitry 2100 includes one or more instances of arithmetic modules 2131, for example, each including an electrical node set 2141 upon which informational data is represented digitally as a corresponding voltage configuration 2151. Transistor-based circuitry 2100 likewise includes one or more instances of arithmetic modules 2132 each including an electrical node set 2142 upon which informational data is represented digitally as a corresponding voltage configuration 2152. Transistor-based circuitry 2100 likewise includes one or more instances of (conditional) notification modules 2133 each including an electrical node set 2143 upon which informational data is represented digitally as a corresponding voltage configuration 2153. Transistor-based circuitry 2100 likewise includes one or more instances of notification modules 2134 each including an electrical node set 2144 upon which informational data is represented digitally as a corresponding voltage configuration 2154. Transistor-based circuitry 2100 likewise includes one or more instances of detection modules 2135 each including an electrical node set 2145 upon which informational data is represented digitally as a corresponding voltage configuration 2155. Transistor-based circuitry 2100 likewise includes one or more instances of (conditional) invocation modules 2136 each including an electrical node set 2146 upon which informational data is represented digitally as a corresponding voltage configuration 2156. In some variants, as described below in the clauses and claims, such a module implements such functionality jointly (in conjunction with other modules or processing units 302 described herein, e.g.). Alternatively or additionally, in some variants such modules (or components thereof) may be distributed (so that some are implemented in special-purpose circuitry 322 of respective servers 300, e.g.) or as described above with reference to FIG. 15.

Figure 22:
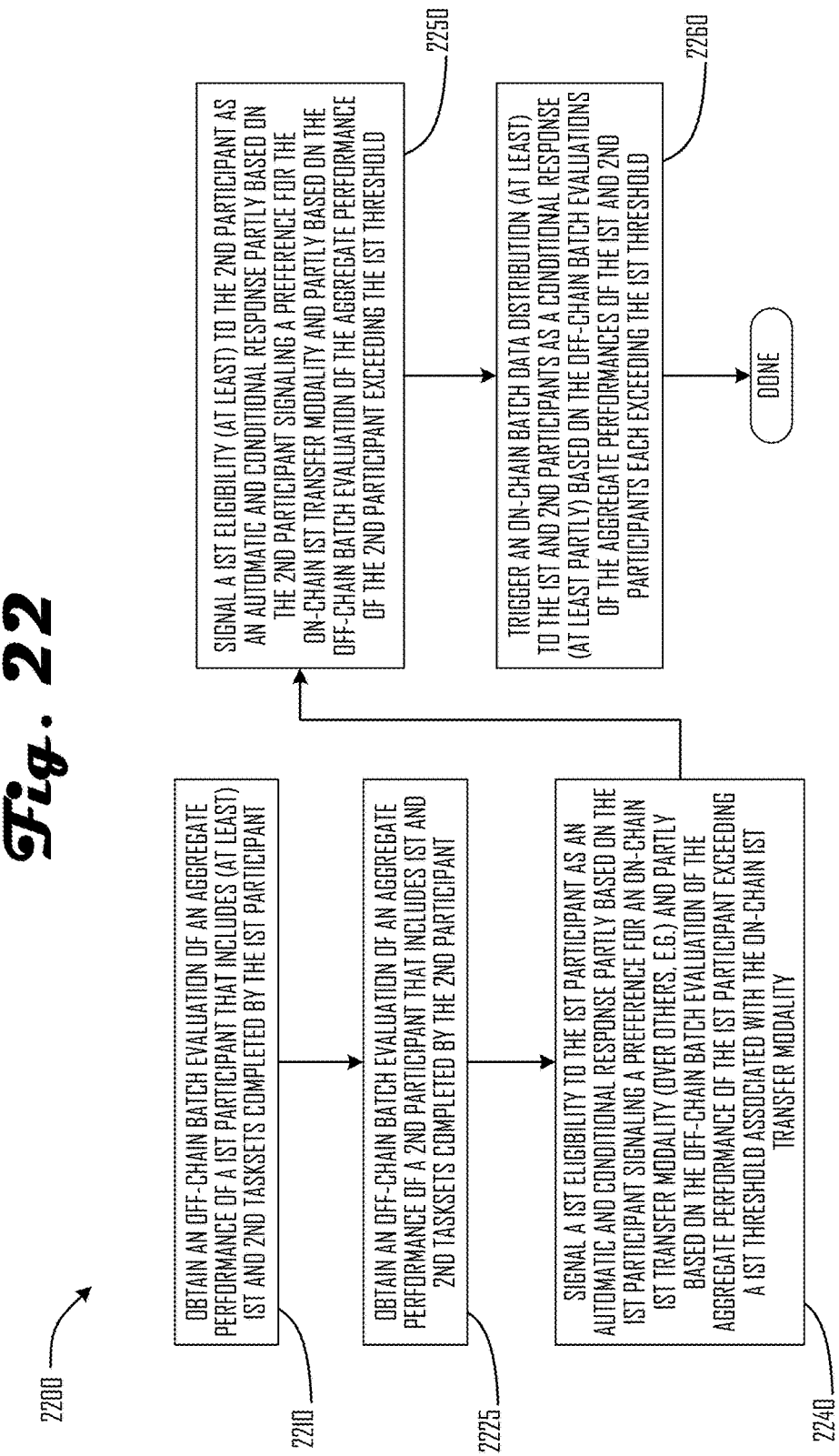
FIG. 22 depicts a data distribution flow in which one or more improved technologies may be incorporated.

FIG. 2200 illustrates an operational flow 2200 suitable for use with at least one embodiment, such as may be performed (in some variants) on a server 300 using special-purpose circuitry 322 depicting several participants in various stages (of participant signup process flow 900, e.g.). As will be recognized by those having ordinary skill in the art, not all events of information management are illustrated in FIG. 22. Rather, for clarity, only those steps reasonably relevant to describing the tabular data modification aspects of flow 2200 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 2210 describes obtaining an off-chain batch evaluation of an aggregate performance of a first participant that includes first and second tasksets completed by the first participant (one or more arithmetic modules 2131 computing an account balance of an in-app currency based upon task completion incentives 645 earned by the first participant, e.g.). This can occur, for example, in a context in which a first participant 1920A reports several taskset completions 828, 1928 each having an incentive 645 or other performance score 2065 (dependent upon completion speed and other performance or valuation metrics, e.g.).

Operation 2225 describes obtaining an off-chain batch evaluation of an aggregate performance of a second participant that includes first and second tasksets completed by the second participant (one or more arithmetic modules 2132 updating an account balance of an in-app currency based upon task completion incentives 645 earned by the second participant, e.g.). This can occur, for example, in a context in which second participant 1920B reports several tasksets each associated with one or more instances of email addresses, (anonymous or other) wallet addresses, account numbers, public keys, organization or user names, or other such participant identifiers (or a combination thereof) expressed as a voltage configuration 2152 on node set 2142. Alternatively or additionally, a central aggregation module 326 of server 300 may implement such arithmetic modules 2131, 2132 for each participant that are then downloaded as each participant's current aggregate performance (account balance, e.g.).

Operation 2240 describes signaling a first eligibility to the first participant as an automatic and conditional response partly based on the first participant signaling a preference for an on-chain first transfer modality and partly based on the off-chain batch evaluation of the aggregate performance of the first participant exceeding a first threshold associated with the on-chain first transfer modality (one or more conditional notification modules 2133 causing an eligibility notification 1955 referring to the on-chain first transfer modality 1871B defined in a permission modification 1936 to be transmitted, e.g.). This can occur, for example, in a context in which a Boolean voltage configuration 2153 toggles (from low to high voltage, e.g.) to reflect the automatic and conditional response, in which the threshold 1872B being reached is one of the criteria required for the Boolean voltage configuration 2153 to toggle, and in which the toggle is manifested by a user-actionable batch distribution control 2063 (with text like "ACCEPT TRANSFER," e.g.) becoming enabled in association with an upcoming on-chain batch data distribution 1982. In some contexts the eligibility notification 1955 may also be conditioned upon the next scheduled on-chain batch data distribution being not too remote (less than a maximum of 1 to 5 days in the future, e.g.), upon the next scheduled on-chain batch data distribution being not too imminent (at least 2 to 20 minutes in the future, e.g.), or upon other such notification criteria (defined in the preferences 2064 of the first participant or in the terms of the modality 1871B defined by a sponsoring entity 110A, e.g.) are met. Alternatively or additionally, in some variants the terms 1914 of a campaign may require that the eligibility notification 1955 also be conditioned upon the first participant 1920A having a high enough priority (as a function of task volume or queue position, e.g.).

Operation 2250 describes signaling a first eligibility to the second participant as an automatic and conditional response partly based on the second participant signaling a preference for the on-chain first transfer modality and partly based on the off-chain batch evaluation of the aggregate performance of the second participant exceeding the first threshold (one or more conditional notification modules 2134 causing a transmission manifesting a new eligibility 451 of the second participant 1920B defined in earlier notification permissions 1916 or in a later permission modification 1936, e.g.). This can occur, for example, in a context in which a Boolean voltage configuration 2154 toggles (from high to low voltage, e.g.) to reflect the automatic and conditional response and in which the threshold 1872B being reached is one of the criteria required for the voltage configuration 2154 pertaining to the second participant to toggle. In some contexts the eligibility notification 1955 may also occur only if the next scheduled on-chain batch data distribution is not too imminent or too remote, if the last taskset completion 1928B is of a particular taskset type 644, if the eligibility notification 1955 is appropriate for the time zone of a most recent location of the second participant (as reported by GPS data or an apparent IP address, e.g.), if a next scheduled on-chain batch data distribution is not too imminent or remote, or if other such notification criteria (defined in terms 1914, e.g.) are met. In some contexts, for example, such thresholds 1872 or other criteria may be provided by one or more affiliates 10 in records 640 that define the tasksets to be completed.

Operation 2260 describes triggering an on-chain batch data distribution to the first and second participants as a conditional response based on the off-chain batch evaluations of the aggregate performances of the first and second participants each exceeding the first threshold (one or more conditional invocation modules 2136 performing or otherwise causing an on-chain batch data distribution 1982 of blockchain content to multiple participants 1920 including the first and second as a conditional response partly based on the off-chain batch evaluation of the aggregate performance 1980 of each participant participating in the on-chain batch data distribution 1982 exceeding the first threshold 1872B associated with the on-chain first transfer modality 1871B, e.g.). This can occur, for example, in a context in which such participants 1920 have each consented to such notifications, in which each participant has requested to participate in the on-chain batch data distribution 1982 also (by opting in following an eligibility notification 1955, e.g.), and in which transfers from the data distribution system (of blockchain tokens, e.g.) would otherwise suffer more frequent on-chain transfer delays (due to falsified transactions or other problems that delay or prevent a network consensus correctly reflecting data distribution 1982, e.g.) or would not otherwise allow a data distribution to reflect the most favorable transfer modality (in terms of availability or speed, e.g.) for which each participant 1920 qualifies. Alternatively or additionally, some modalities may initially set participant preferences affirmatively for eligibility notifications 1955 and on-chain batch data distributions 1982 but allow participants 1920 to opt out of such eligibility notifications 1955 or such on-chain batch data distribution 1982 (or both). User-actionable eligibility notification control 2063 and user-actionable batch distribution control 2066 may respectively present labels like "OPT OUT OF NOTIFICATION" and "OPT OUT OF DISTRIBUTION" in each eligibility notification 1955, for example, that an opted-in participant receives. If a participant is opted out of distribution, moreover, each eligibility notification 1955 may instead present a user-actionable batch distribution control 2066 with a label like "OPT INTO DISTRIBUTION."

Referring again to FIG. 15, in some variants a notification module 1531 may be configured to notify a first party of an opportunity to earn a first incentive by completing a first taskset (offering participant 20A a bounty of in-app currency for listing his vehicle 795 online). In some variants notification module 1533 can likewise be configured to notify the first party of having received that bounty even without any immediately apparent way to spend it. If such an action unlocks another opportunity to earn an additional amount of in-app currency (by recruiting and engaging a qualified third participant 20B to assure potential buyers that the vehicle 795 is reliable, e.g.), however, in some variants notification module 1534 can likewise be inform him as such. In some contexts, moreover, a taskset that includes actually transferring title to the vehicle 795 may encompass the value of the vehicle, so that the vehicle is effectively bartered or purchased with in-app currency and so that no actual currency is necessarily associated with the transfer.

In light of teachings herein, numerous existing techniques may be applied for configuring special-purpose circuitry or other structures effective for configuring, broadcasting, and otherwise managing incentives, dispensations, and other tasks as described herein without undue experimentation. See, e.g., U.S. Pat. No. 9,747,586 ("System and method for issuance of electronic currency substantiated by a reserve of assets"); U.S. Pat. No. 9,737,813 ("Cognitive training method for semantic skills enhancement"); U.S. Pat. No. 9,672,499 ("Data analytic and security mechanism for implementing a hot wallet service"); U.S. Pat. No. 9,646,029 ("Methods and apparatus for a distributed database within a network"); U.S. Pat. No. 9,595,034 ("System and method for monitoring third party access to a restricted item"); U.S. Pat. No. 9,576,313 ("Recommendation systems and methods using interest correlation"); U.S. Pat. No. 9,569,771 ("Method and system for storage and retrieval of blockchain blocks using Galois fields"); U.S. Pat. No. 9,569,439 ("Context-sensitive query enrichment"); U.S. Pub. No. 20170243239 ("Incentivized navigation"); U.S. Pub. No. 20170132199 ("Unconventional virtual assistant interactions"); U.S. Pub. No. 20160260095 ("Containerized Computational Task Execution Management Using a Secure Distributed Transaction Ledger"); U.S. Pat. Pub. No. 20140214845 ("Product classification into product type families"); U.S. Pub. No. 20140200980 ("System and method for mediating transactions among a plurality of social commerce businesses"); U.S. Pat. Pub. No. 20140172767 ("Budget optimal crowdsourcing"); U.S. Pub. No. 20130346254 ("Project intermediary device and project intermediary method"); U.S. Pub. No. 20130061288 ("Method for controlling trust and confidentiality in daily transactions of the digital environment"); U.S. Pub. No. 20120095908 ("Distributed Computing for Engaging Software Services"); U.S. Pub. No. 20120020476 ("Method for Performing a Cryptographic Task in an Electronic Hardware Component"); U.S. Pat. Pub. No. 20110313933 ("Decision-theoretic control of crowdsourced workflows"); and U.S. Pub. No. 20100332336 ("System and method for electronic wallet conversion"). Although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses

1. An incentivization system comprising:

transistor-based circuitry (one or more notification modules 1531, e.g.) configured to notify a first participant 20 of an opportunity to earn a first incentive by completing a first taskset 441A;

transistor-based circuitry (one or more detection modules 1532, e.g.) configured to allow the first participant 20 to earn the first incentive by completing the first taskset 441A;

transistor-based circuitry (one or more notification modules 1533, e.g.) configured to notify the first participant 20 of having received the first incentive in lieu of signaling any immediate eligibility for any in-kind dispensation (a share of stock or a cryptoasset, e.g.) as a conditional response partly based on the first participant 20 having completed the first taskset 441A and partly based on an aggregated amount that includes the first incentive being smaller than a first threshold 471;

transistor-based circuitry (one or more notification modules 1534, e.g.) configured to notify the first participant 20 of an opportunity to earn a second incentive by completing a second taskset 441B;

transistor-based circuitry (one or more detection modules 1535, e.g.) configured to allow the first participant 20 to earn the second incentive by completing the second taskset 441B, wherein the first participant 20 is notified of having earned an eligibility to receive an in-kind dispensation associated with an aggregated amount that includes the first and second incentives as an automatic and conditional response partly based on the first participant 20 having completed the first and second taskset 441 and partly based on the aggregated amount that includes the first and second incentives being at least equal to the first threshold 471 and wherein the second taskset 441B is unlocked to the first participant 20 by the first participant 20 having completed the first taskset 441A; and transistor-based circuitry (one or more dispensation modules 1536 in conjunction with a dispenser, e.g.) configured to implement the in-kind dispensation associated with the aggregated amount that includes the first and second incentives as a conditional response to a dispensation request from the first participant 20.

2. The system of System Clause 1, wherein the transistor-based circuitry (one or more dispensation modules 1536 in conjunction with dispenser 793, e.g.) configured to implement the in-kind dispensation associated with the aggregated amount that includes the first and second incentives as a conditional response to a dispensation request from the first participant 20 comprises:

one or more dispensation modules 1536 in conjunction with a dispenser 793, wherein the dispenser is configured to expel the in-kind dispensation as a physical article (a ticket, e.g.).

3. The system of System Clause 1, wherein the transistor-based circuitry (one or more dispensation modules 1536 in conjunction with dispenser 793, e.g.) configured to implement the in-kind dispensation associated with the aggregated amount that includes the first and second incentives as a conditional response to a dispensation request from the first participant 20 comprises:

one or more dispensation modules 1536 in conjunction with a dispenser 793.

4. The system of System Clause 1, wherein all of the transistor-based circuitry 1500 is implemented on a single application-specific integrated circuit (ASIC).

5. The system of System Clause 1, wherein the transistor-based circuitry 1500, 2100 is distributed across two or more mutually remote facilities.

6. The system of System Clause 1, wherein the transistor-based circuitry 1500, 2100 is also configured to perform one or more methods described below.

7. A method of operating a data distribution system (using one or more data distribution servers 300, e.g.), the method comprising:

invoking transistor-based circuitry configured to obtain an off-list batch evaluation 1981 of an aggregate performance 1980 (a task completion count or other sum of taskset-performance-indicative scores 2065, e.g.) of a first participant 1920A that includes (at least) first and second tasksets (defined in one or more taskset broadcasts 815 or otherwise by taskset definitions 1918, e.g.) completed by the first participant 1920A (as described above with reference to operation 2210, e.g.);

invoking transistor-based circuitry configured to obtain an off-list batch evaluation 1981 of an aggregate performance 1980 of a second participant 1920A that includes (at least) first and second tasksets completed by the second participant 1920B (as described above with reference to operation 2225, e.g.);

invoking transistor-based circuitry configured to signal a first eligibility 451 to the first participant 1920A (via an eligibility notification 855, 1955, e.g.) as an automatic and conditional response partly based on the first participant signaling a preference for an on-list first transfer modality 1871B (having a blocksize 1878B smaller than a blocksize 1878A of the less-favored modality 1871A, e.g.—or a greater frequency 1876B than a frequency 1876A of the less-favored modality 1871A) over one or more other transfer modalities 1872A (having a standard blocksize 1878A or frequency 1876A (or both), e.g.) and partly based on the off-list batch evaluation 1981 of the aggregate performance 1980 of the first participant (batch evaluation 1981, e.g.) exceeding a first threshold 1872B associated with the on-list first transfer modality 1871B (as described above with reference to operation 2240, e.g.);

invoking transistor-based circuitry configured to signal a first eligibility 451 to the second participant 1920B (by conditionally presenting or enabling a user-actionable eligibility notification control 2063 so as to signify the second participant 1920B receiving a new eligibility, e.g.) an automatic and conditional response partly based on the second participant 1920B signaling (having earlier signaled with permissions 1916 given upon registration 1910, e.g.) a preference 2064 for the on-list first transfer modality 1871B over one or more other transfer modalities 1872A, 1872C (in the initial permissions 1916 or in a permission modification 1936, e.g.) and partly based on the off-list batch evaluation 1981 of the aggregate performance 1980 of the first participant (batch evaluation 1981, e.g.) exceeding the first threshold 1872B associated with the on-list first transfer modality (as described above with reference to operation 2250, e.g.); and invoking transistor-based circuitry configured to trigger an on-list batch data distribution 1982 to (a digital wallet 266 or other physical asset comprising) the first and second participants 1920A-B as a conditional response partly based on the off-list batch evaluation of the aggregate performance of the first and second participants each exceeding the first threshold associated with the on-list first transfer modality and partly based on the first and second participants 1920A-B both having consented to participate in the on-list batch data distribution 1982 (as described above with reference to operation 2260, e.g.).

8. The method of Clause 7, comprising:

initially setting preferences 2064 affirmatively (upon an initial registration 1910 or a selection of modality 1871A-C, e.g.) for eligibility notifications 1955 of the first and second participants 1920 respectively.

9. The method of Clause 7, comprising:

initially setting preferences 2064 negatively (so as not to authorize the participant's inclusion, e.g.) for components of the on-list batch data distributions 1982 of the first and second participants 1920 respectively.

10. The method of Clause 7, comprising:

initially setting preferences 2064 affirmatively for eligibility notifications 1955 but not for components of the on-list batch data distributions 1982 of the first and second participants 1920A-B respectively; and allowing the first and second participants 1920 each to opt out of such eligibility notifications 1955.

11. The method of Clause 7, comprising:

initially setting preferences 2064 affirmatively for eligibility notifications 1955 but not for components of the on-list batch data distributions 1982 of the first and second participants 1920A-C respectively; and allowing the first and second participants 1920 each to opt out of such eligibility notifications 1955 by invoking a user-actionable eligibility notification control 2063 configured to stop a delivery of future eligibility notifications 1955 later occurring by default, wherein the user-actionable eligibility notification control 2063 was delivered to the participants as a component of one of the eligibility notifications 1955.

12. The method of Clause 7, comprising:
   initially setting preferences 2064 affirmatively for eligibility notifications 1955 but not for components of the on-list batch data distributions 1982 of the first and second participants 1920A-B respectively; and
   allowing the first and second participants 1920 each to opt into an on-list batch data distribution 1982.

13. The method of Clause 7, comprising:
   initially setting preferences 2064 affirmatively for eligibility notifications 1955 but not for components of the on-list batch data distributions 1982 of the first and second participants 1920 respectively; and
   allowing the first and second participants 1920 each to opt into the on-list batch data distribution 1982 by invoking a user-actionable batch distribution control 2066 configured to stop a delivery of on-list batch data distributions 1982 later occurring by default, wherein the user-actionable batch distribution control 2066 was delivered to the participants as a component of one of the eligibility notifications 1955.

14. The method of Clause 7, wherein the on-list batch data distribution 1982 also includes a transmission to a third participant 1920C; and wherein the conditional response is also partly based on all of the participants each having opted into the on-list batch data distribution 1982 after receiving an eligibility notification 855, 1955 announcing the first eligibility 451 and before the on-list batch data distribution 1982 is triggered.

15. The method of ANY of the above method clauses, wherein the on-list batch data distribution 1982 (if applicable) also includes a transmission to a third participant 1920C; wherein the conditional response is also partly based on all of the participants each having opted into the on-list batch data distribution 1982 after receiving an eligibility notification 855, 1955 announcing the first eligibility 451 and before the on-list batch data distribution 1982 is triggered; and wherein the eligibility notification 855, 1955 announcing the first eligibility 451 presents a first user-actionable batch distribution control 2066 (touchscreen button or menu option, e.g.).

16. The method of ANY of the above method clauses, wherein said on-chain batch data distribution includes at least one in-kind dispensation.

17. The method of ANY of the above method clauses, further comprising:
   configuring the eligibility notification 855, 1955 at least partly based upon a dispensation type selection identifying one or more in-kind online resources.

18. The method of ANY of the above method clauses, further comprising:
   configuring the eligibility notification 855, 1955 at least partly upon a dispensation type selection identifying a range of prize valuations.

19. The method of ANY of the above method clauses, further comprising:
   configuring the eligibility notification 855, 1955 at least partly upon a dispensation type selection identifying one or more in-kind online resources including at least one cryptocurrency.

20. The method of ANY of the above method clauses, further comprising:
   configuring the eligibility notification 855, 1955 at least partly based upon a dispensation type selection identifying one or more in-kind online resources including at least one cryptocurrency; and
   facilitating a registration of a digital wallet 266 in preparation to receive an initial denomination of the at least one cryptocurrency.

21. The method of ANY of the above method clauses, further comprising:
   configuring the eligibility notification 855, 1955 at least partly based upon a dispensation type selection identifying one or more participant-preferred physical goods.

22. The method of ANY of the above method clauses, further comprising:
   creating the on-list first transfer modality 1871 (at least) in association with both an on-list transfer type 1870 and the first threshold 1872.

23. The method of ANY of the above method clauses, wherein the on-list batch data distribution 1982 includes a transmission to a third participant 1920C as a component of the conditional response; and wherein the conditional response is also partly based on the first, second and third participants each having opted into the on-list batch data distribution 1982 after receiving an eligibility notification 855, 1955 announcing the on-list batch data distribution 1982 and before the on-list batch data distribution 1982 is triggered.

24. The method of ANY of the above method clauses, wherein the on-list batch data distribution 1982 includes a transmission to a third participant 1920C as a component of the conditional response; wherein the conditional response is also partly based on the first, second and third participants each having opted into the on-list batch data distribution 1982 after receiving an eligibility notification 855, 1955 announcing the on-list batch data distribution 1982 and before the on-list batch data distribution 1982 is triggered; and wherein the eligibility notification 855, 1955 presents the first threshold 1872B associated with the on-list first transfer modality 1870B as a default scalar quantity (as an urgency 1879 or other user-adjustable parameter 1873B, e.g.).

25. The method of ANY of the above method clauses, wherein the on-list batch data distribution 1982 includes a transmission to a third participant 1920C as a component of the conditional response; wherein the conditional response is also partly based on the first, second and third participants each having opted into the on-list batch data distribution 1982 after receiving an eligibility notification 855, 1955 announcing the on-list batch data distribution 1982 and before the on-list batch data distribution 1982 is triggered; wherein the eligibility notification 855, 1955 presents the first threshold 1872B associated with the on-list first transfer modality 1870B as a default scalar quantity (as an urgency 1879 or other user-adjustable parameter 1873B, e.g.); and wherein the first participant 1920A accepts the default scalar quantity and the second participant 1920B replaces the default scalar quantity with a larger value (up to the off-list batch evaluation 1981 of the aggregate performance 1980 of the second participant 1920C, e.g.).

26. The method of ANY of the above method clauses, wherein the on-list batch data distribution 1982 includes a transmission to a third participant 1920C as a component of the conditional response; wherein the conditional response is also partly based on the first, second and third participants each having opted into the on-list batch data distribution 1982 after receiving an eligibility notification 855, 1955 announcing the on-list batch data distribution 1982 and before the on-list batch data distribution 1982 is triggered; wherein the eligibility notification 855, 1955 presents the first threshold 1872B associated with the on-list first transfer modality 1870B as a default scalar quantity (as an urgency 1879 or other user-adjustable parameter 1873B, e.g.); wherein the first participant 1920A accepts the default scalar quantity and the second participant 1920B replaces the default scalar quantity with a larger value (up to the off-list batch evaluation 1981 of the aggregate performance 1980 of the second participant 1920C, e.g.); and wherein the batch data distribution 1982 to the first and second participants is performed using the default scalar quantity and the larger value respectively.

27. The method of ANY of the above method clauses, wherein the on-list batch data distribution 1982 includes a transmission to a third participant 1920C as a component of the conditional response; and wherein the conditional response is also partly based on the first, second and third participants each having opted into the on-list batch data distribution 1982 after receiving an eligibility notification 855, 1955 announcing the on-list batch data distribution 1982 and before the on-list batch data distribution 1982 is triggered.

28. The method of ANY of the above method clauses, wherein the on-list batch data distribution 1982 includes a transmission to a third participant 1920C as a component of the conditional response and wherein the conditional response is partly based on the off-list batch evaluations of the aggregate performances 1980 of the first and second participants 1920A-B each exceeding the first threshold associated with the on-list first transfer modality and partly based on an off-list batch evaluation 1980 of an aggregate performance of the third participant also exceeding the first threshold associated with the on-list first transfer modality.

29. The method of ANY of the above method clauses, wherein the on-list batch data distribution 1982 includes a transmission to a third participant 1920C as a component of the conditional response; wherein the conditional response is partly based on the off-list batch evaluations of the aggregate performances 1980 of the first and second participants 1920A-B each exceeding the first threshold associated with the on-list first transfer modality and partly based on an off-list batch evaluation 1980 of an aggregate performance of the third participant also exceeding the first threshold associated with the on-list first transfer modality; and wherein the first, second and third participants have all requested to participate in the on-list batch data distribution 1982 but in which the data distribution system is only ever configured to send manually triggered information relating to the on-list first transfer modality 1871B to the third participant.

30. The method of ANY of the above method clauses, wherein the on-list batch data distribution 1982 includes a transmission to one or more block validation devices 200D that use a proof-of-stake validation consensus protocol.

31. The method of ANY of the above method clauses, wherein the on-list batch data distribution 1982 includes a transmission to one or more block validation devices 200E that use a proof-of-activity validation consensus protocol.

32. The method of ANY of the above method clauses, wherein the invoking transistor-based circuitry configured to trigger the on-list batch data distribution 1982 to the first and second participants 1920A-B as the conditional response partly based on the off-list batch evaluation of the aggregate performance of the first and second participants each exceeding the first threshold associated with the on-list first transfer modality and partly based on the first and second participants 1920A-B both having consented to participate in the on-list batch data distribution 1982 comprises:

uploading a device-executable batch configuration file to one or more servers 300; and triggering the on-list batch data distribution 1982 to the first and second participants 1920A-B as the conditional response partly based on the off-list batch evaluation of the aggregate performance of the first and second participants each exceeding the first threshold associated with the on-list first transfer modality and partly based on the first and second participants 1920A-B both having consented to participate in the on-list batch data distribution 1982 by invoking an execution of the batch configuration file.

33. The method of ANY of the above method clauses, wherein the on-list batch data distribution 1982 (if applicable) also includes a transmission to a third participant 1920C; wherein the conditional response is also partly based on all of the participants each having opted into the on-list batch data distribution 1982 after receiving an eligibility notification 855, 1955 announcing the first eligibility 451 and before the on-list batch data distribution 1982 is triggered; wherein the eligibility notification 855, 1955 announcing the first eligibility 451 presents a first user-actionable batch distribution control 2066; and wherein all of the participants each manifest opting into the on-list batch data distribution 1982 by actuating the user-actionable batch distribution control 2066.

34. The method of ANY of the above method clauses, wherein the on-list batch data distribution 1982 also includes a transmission to an additional participant 1920 whose implementation of the on-list first transfer modality 1871B includes a setting 2061 (among participant-configurable preferences, e.g.) having a default value 2062 by which the on-list first transfer modality 1871B is set to include the additional participant 1920 as a recipient in the on-list batch data distribution 1982.

35. The method of ANY of the above method clauses, wherein the on-list batch data distribution 1982 incorporates a modality 1871 (at least partly) based on a directed acyclic graph.

36. The method of ANY of the above method clauses, wherein the on-list batch data distribution 1982 incorporates a blockchain modality 1871 in which proof-of-work timestamping is provided in each block.

37. The method of ANY of the above method clauses, wherein the on-list batch data distribution 1982 incorporates a modality 1871 that implements a distributed ledger.

38. The method of ANY of the above method clauses, wherein the off-list batch evaluations 1881 and the on-list batch data distribution 1182 both reduce a vulnerability of the data distribution system to on-list transfer failures (attacks or other phenomena that delay or prevent a network consensus correctly reflecting the data distribution 1182, e.g.) and thereby constitute a network improvement (i.e. in relation to an existing state of the art).

39. The method of ANY of the above method clauses, wherein the first participant 20 is a participant 1920 who has completed two or more tasksets.

40. A data distribution system comprising:

transistor-based circuitry (one or more arithmetic modules 2131, e.g.) configured to obtain an off-list batch evaluation 1981 of an aggregate performance 1980 (a task completion count or other sum of taskset-performance-indicative scores 2065, e.g.) of a first participant 1920A that includes (at least) first and second tasksets (defined in one or more taskset broadcasts 815 or otherwise by taskset definitions 1918, e.g.) completed by the first participant 1920A;

transistor-based circuitry (one or more arithmetic modules 2132 in conjunction with a receiver, e.g.) configured to obtain an off-list batch evaluation 1981 of an aggregate performance 1980 of a second participant 1920A that includes (at least) first and second tasksets completed by the second participant 1920B;

transistor-based circuitry (one or more conditional notification modules 2133, e.g.) configured to signal a first eligibility 451 to the first participant 1920A (via an eligibility notification 855, 1955, e.g.) as an automatic and conditional response partly based on the first participant signaling a preference for an on-list first transfer modality 1871B (having a blocksize 1878B smaller than a blocksize 1878A of the less-favored modality 1871A, e.g.—or a greater frequency 1876B than a frequency 1876A of the less-favored modality 1871A) over one or more other transfer modalities 1872A (an off-list second transfer modality 1871A, e.g.) and partly based on the off-list batch evaluation 1981 of the aggregate performance 1980 of the first participant (batch evaluation 1981, e.g.) exceeding a first threshold 1872B associated with the on-list first transfer modality 1871B;

transistor-based circuitry (one or more conditional notification modules 2134, e.g.) configured to signal a first eligibility 451 to the second participant 1920B (by conditionally presenting or enabling a user-actionable eligibility notification control 2063 so as to signify the second participant 1920B receiving a new eligibility, e.g.) an automatic and conditional response partly based on the second participant 1920B signaling (having earlier signaled with permissions 1916 given upon registration 1910, e.g.) a preference 2064 for the on-list first transfer modality 1871B over one or more other transfer modalities 1872A, 1872C (in the initial permissions 1916 or in a permission modification 1936, e.g.) and partly based on the off-list batch evaluation 1981 of the aggregate performance 1980 of the first participant (batch evaluation 1981, e.g.) exceeding the first threshold 1872B associated with the on-list first transfer modality; and transistor-based circuitry (a detection module 2135 in conjunction with a conditional invocation module 2136, e.g.) configured to trigger an on-list batch data distribution 1982 to (at least) the first and second participants 1920A-B as a conditional response partly based on the off-list batch evaluations of the aggregate performance of the first and second participants each exceeding the first threshold associated with the on-list first transfer modality and partly based on the first and second participants 1920A-B both having consented to participate in the on-list batch data distribution 1982.

41. The system of Clause 40, wherein the transistor-based circuitry configured to trigger an on-list batch data distribution 1982 to the first and second participants 1920A-B as a conditional response partly based on the off-list batch evaluation of the aggregate performance of the first and second participants each exceeding the first threshold associated with the on-list first transfer modality and partly based on the first and second participants 1920A-B both having consented to participate in the on-list batch data distribution 1982 comprises:

a dispenser 793 of the kiosk, wherein the dispenser is configured to implement (a component of) the on-list batch data distribution 1982 as a physical article, and wherein the physical article is a digital wallet 266.

42. The system of ANY of the above system clauses, further comprising:

a physical article implementing a digital wallet 266 configured as a destination (one of many, e.g.) of the on-list batch data distribution 1982, wherein the digital wallet 266 is configured to contain a private key 271 by which a component of the on-list batch data distribution 1982 may be extracted.

43. The system of ANY of the above system clauses, further comprising:

a physical article implementing a digital wallet 266 configured as a destination of the on-list batch data distribution 1982, wherein the on-list batch data distribution 1982 includes crypto assets 273 that express one or more indexes 1875 (see FIG. 18) and that can later be retrieved by an owner of the digital wallet 266.

44. The system of ANY of the above system clauses, further comprising:

a physical article implementing a digital wallet 266 configured as a destination of the on-list batch data distribution 1982, wherein the on-list batch data distribution 1982 includes sensor data 272 (medical records or other measurements, e.g.) that can later be retrieved by an owner of the digital wallet 266.

45. The system of ANY of the above system clauses, further comprising:

a physical article implementing a digital wallet 266 configured as a destination of the on-list batch data distribution 1982, wherein the on-list batch data distribution 1982 includes crypto assets 273 (digital tokens or cryptocurrency, e.g.) that can later be retrieved by an owner of the digital wallet 266.

46. The system of ANY of the above system clauses, further comprising:

a physical article implementing a digital wallet 266 configured as a destination of the on-list batch data distribution 1982, wherein the on-list batch data distribution 1982 includes crypto assets 273 that express multiple frequencies 1876 and that can later be retrieved by an owner of the digital wallet 266.

47. The system of ANY of the above system clauses, further comprising:

a physical article implementing a digital wallet 266 configured as a destination of the on-list batch data distribution 1982, wherein the on-list batch data distribution 1982 includes crypto assets 273 that express multiple amounts of energy 1877 and that can later be retrieved by an owner of the digital wallet 266.

48. The system of ANY of the above system clauses, further comprising:

a physical article implementing a digital wallet 266 configured as a destination of the on-list batch data distribution 1982, wherein the on-list batch data distribution 1982 includes crypto assets 273 that express multiple blocksizes 1878 and that can later be retrieved by an owner of the digital wallet 266.

49. The system of ANY of the above system clauses, further comprising:

a physical article implementing a digital wallet 266 configured as a destination of the on-list batch data distribution 1982, wherein the on-list batch data distribution 1982 includes crypto assets 273 that express multiple levels of urgency 1879 (low or medium or high, e.g.) and that can later be retrieved by an owner of the digital wallet 266.

50. The system of ANY of the above system clauses, further comprising:

a physical article implementing a digital wallet 266 configured as a destination of the on-list batch data distribution 1982, wherein the on-list batch data distribution 1982 includes crypto assets 273 that express provenance data 274 of articles of manufacture (permanently documenting a safety-indicative provenance of tangible products vulnerable to counterfeiting such as comestibles or vehicle components, e.g.) and that can later be retrieved by an owner of the digital wallet 266.

51. The system of ANY of the above system clauses, wherein the transistor-based circuitry 1500, 2100 is also configured to perform one or more methods described below.

52. An incentivization method comprising:

invoking transistor-based circuitry (one or more notification modules 1531, e.g.) configured to notify a first participant 20 of an opportunity to earn a first incentive by completing a first taskset 441A;

invoking transistor-based circuitry (one or more detection modules 1532, e.g.) configured to allow the first participant 20 to earn the first incentive by completing the first taskset 441A;

invoking transistor-based circuitry (one or more notification modules 1533, e.g.) configured to notify the first participant 20 of having received the first incentive in lieu of signaling any immediate eligibility for any in-kind dispensation (a share of stock or a cryptoasset, e.g.) as a conditional response partly based on the first participant 20 having completed the first taskset 441A and partly based on an aggregated amount that includes the first incentive being smaller than a first threshold 471;

invoking transistor-based circuitry (one or more notification modules 1534, e.g.) configured to notify the first participant 20 of an opportunity to earn a second incentive by completing a second taskset 441B;

invoking transistor-based circuitry (one or more detection modules 1535, e.g.) configured to allow the first participant 20 to earn the second incentive by completing the second taskset 441B, wherein the first participant 20 is notified of having earned an eligibility to receive an in-kind dispensation associated with an aggregated amount that includes the first and second incentives as an automatic and conditional response partly based on the first participant 20 having completed the first and second tasksets 441 and partly based on the aggregated amount that includes the first and second incentives being at least equal to the first threshold 471, and wherein the second taskset 441B is unlocked to the first participant 20 by the first participant 20 having completed the first taskset 441A; and implementing the in-kind dispensation associated with the aggregated amount that includes the first and second incentives as a conditional response to a dispensation request from the first participant 20.

53. The method of ANY of the above method clauses, wherein the invoking transistor-based circuitry configured to allow the first participant 20 to earn the second incentive by completing the second taskset 441B (if applicable) comprises:

notifying the first participant 20 of having earned the eligibility to receive the in-kind dispensation associated with the aggregated amount that includes the first and second incentives as the automatic and conditional response partly based on the first participant 20 having completed the first and second tasksets 441 and partly based on the aggregated amount that includes the first and second incentives being at least equal to the first threshold 471; and receiving proof of completion of the second taskset, wherein the proof of completion includes (at least) a completion registration (a message 735 confirming the completion received from an affiliate portal or other instrumentality of a third party entity 110A, e.g.).

54. The method of ANY of the above method clauses, wherein the first threshold 471 (if applicable) is based on one or more resource type identifiers selected by the first party.

55. The method of ANY of the above method clauses, wherein the first taskset 441A comprises watching an online video.

56. The method of ANY of the above method clauses, wherein the second taskset 441B essentially consists of delivering material (supplies 591, e.g.).

57. The method of ANY of the above method clauses, wherein the second taskset 441B comprises a component of a healthcare regimen (taking medications provided via a portable dispenser 581, e.g.).

58. The method of ANY of the above method clauses, wherein the second taskset 441B comprises establishing one or more credentials of the first participant 20 (earning a license 571 or certification 572, e.g.).

59. The method of ANY of the above method clauses, wherein the first taskset 441A comprises the first party answering one or more online questions correctly (demonstrating the existence of a state-issued license 571 or demonstrating a proficiency 575 by taking an online quiz, e.g.).

60. The method of ANY of the above method clauses, wherein at least one of the first or second taskset 441A-B comprises establishing one or more credentials of the first participant 20 (earning a state-issued license 571, demonstrating the existence of a state-issued license 571, or demonstrating a proficiency 575 by taking an online quiz, e.g.).

61. The method of ANY of the above method clauses, wherein the implementing the in-kind dispensation associated with the aggregated amount that includes the first and second incentives as the conditional response to the dispensation request from the first party comprises:

implementing the in-kind dispensation in an automated batch process simultaneously delivering the in-kind dispensation to numerous recipients (i.e. dozens, e.g.), wherein the first party is one of the numerous recipients.

62. The method of ANY of the above method clauses, wherein the implementing the in-kind dispensation associated with the aggregated amount that includes the first and second incentives as the conditional response to the dispensation request from the first party comprises:

implementing the in-kind dispensation in a broadcast of an online resource.

63. The method of ANY of the above method clauses, wherein the first participant 20 receives only a single unit of a cryptoasset (one Bitcoin, e.g.) in the in-kind dispensation.

64. The method of ANY of the above method clauses, further comprising:

implementing a participant sign up process flow as depicted in FIG. 9.

65. The method of ANY of the above method clauses, further comprising:

implementing an incentive earning flow as depicted in FIG. 10.

66. The method of ANY of the above method clauses, further comprising:

implementing an incentive earning flow as depicted in FIG. 11.

67. The method of ANY of the above method clauses, further comprising:

implementing a dispensation flow as depicted in FIG. 12.

68. The method of ANY of the above method clauses, further comprising:

implementing an affiliate enlistment flow as depicted in FIG. 13.

69. The method of ANY of the above method clauses, further comprising:

implementing an offer addition flow as depicted in FIG. 14.

70. The method of ANY of the above method clauses, further comprising:

mitigating cryptoasset volatility as depicted in FIG. 17.

With respect to said numbered claims expressed below, those skilled in said art will appreciate that recited operations therein may generally be performed in any order. Also, although various operational flows are presented in sequence(s), it should be understood that said various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method of operating a data distribution system, said method comprising:

invoking transistor-based circuitry configured to obtain an off-chain batch evaluation of an aggregate performance of a first taskset participant that includes first and second tasksets completed by said first taskset participant;

invoking transistor-based circuitry configured to obtain an off-chain batch evaluation of an aggregate performance of a second taskset participant that includes first and second tasksets completed by said second taskset participant;

invoking transistor-based circuitry configured to signal a first eligibility to said first taskset participant as an automatic and conditional response partly based on said first taskset participant signaling a preference for an on-chain first transfer modality over one or more other transfer modalities and partly based on said off-chain batch evaluation of said aggregate performance of said first taskset participant exceeding a first threshold associated with said on-chain first transfer modality;

invoking transistor-based circuitry configured to signal a first eligibility to said second taskset participant by conditionally providing a user-actionable eligibility notification control so as to signify said second taskset participant receiving said first eligibility as a new eligibility as an automatic and conditional response partly based on said second taskset participant signaling a preference for said on-chain first transfer modality over one or more other transfer modalities and partly based on said off-chain batch evaluation of said aggregate performance of said second taskset participant exceeding said first threshold associated with said on-chain first transfer modality; and determining an on-chain batch data distribution to numerous taskset participants including said first and second taskset participants as a conditional response partly based on said off-chain batch evaluations of said aggregate performances of said first and second taskset participants each exceeding said first threshold associated with said on-chain first transfer modality and partly based on said first and second taskset participants both having consented to participate in said on-chain batch data distribution; wherein an eligibility notification signaling said first eligibility presents a first user-actionable batch distribution control; wherein all of said taskset participants each manifest opting into said on-chain batch data distribution by actuating said user-actionable batch distribution control; wherein said eligibility notification signaling said first eligibility presents said first user-actionable batch distribution control to a third taskset participant whose aggregate performance exceeds said first threshold and whose implementation of said on-chain first transfer modality includes a setting having an a priori value by which said on-chain first transfer modality is set to include said third taskset participant as a recipient in said on-chain batch data distribution; wherein said first taskset participant of has been notified of an opportunity to receive a first resource by completing said first taskset; wherein said first taskset includes viewing training materials online; wherein said first taskset participant has been allowed to receive said first resource by completing said first taskset; wherein said first taskset participant has been notified of having received said first resource in lieu of signaling any immediate eligibility for any in-kind dispensation as a conditional response partly based on said first taskset participant having completed said first taskset and partly based on an aggregated amount that includes said first resource not exceeding said first threshold associated with said on-chain first transfer modality; wherein said first taskset participant has been notified of an opportunity to receive said second resource by completing said second taskset; wherein said second taskset include a skilled task relating to said training materials; wherein said first taskset participant has been allowed to receive said second resource by completing said second taskset; wherein said first taskset participant has been notified of having received an eligibility to receive an in-kind dispensation associated with said aggregate performance of said first taskset participant that includes said first and second tasksets completed by said first taskset participant as a conditional response partly based on said first taskset participant having completed said first and second tasksets and partly based on said aggregate performance exceeding said first threshold associated with said on-chain first transfer modality; wherein said second taskset including said skilled task relating to said training materials has been unlocked to said first taskset participant by said first taskset participant having completed said first taskset including viewing said training materials; wherein said in-kind dispensation associated with said aggregated amount that includes said first and second resources has been implemented as a conditional response to a dispensation request from said first taskset participant; and wherein said in-kind dispensation is a component of said on-chain batch data distribution; and executing said on-chain batch data distribution to said numerous taskset participants including first special-purpose hardware implementing a first digital wallet configured as a first destination of said on-chain batch data distribution and second special-purpose hardware implementing a second digital wallet configured as a second destination of said on-chain batch data distribution, wherein said first digital wallet contains a first private key, wherein said on-chain batch data distribution includes crypto assets that express one or more indexes that can later be retrieved by said first taskset participant using said first private key, wherein said on-chain batch data distribution finally includes said first and second taskset participants but not said third taskset participant based on said third taskset participant having overridden said a priori value, and wherein said off-chain batch evaluations and said on-chain batch data distribution both reduce a vulnerability of said data distribution system to on-chain transfer failures.

2. The method of claim 1, further comprising:
creating said on-chain first transfer modality in association with both an on-chain transfer type and said first threshold, wherein said on-chain first transfer modality allows said on-chain batch data distribution to include an in-kind dispensation.

3. The method of claim 1, further comprising:
creating said on-chain first transfer modality in association with both an on-chain transfer type and said first threshold, said on-chain first transfer modality including an in-kind dispensation; and
allowing a dispenser to implement said in-kind dispensation as a component of said on-chain batch data distribution by authorizing said dispenser to expel a physical article.

4. The method of claim 1, wherein said on-chain batch data distribution to said numerous taskset participants is also partly based on said first and second taskset participants each having opted into said on-chain batch data distribution after receiving said eligibility notification signaling said on-chain batch data distribution and before said on-chain batch data distribution is triggered; and wherein said eligibility notification presents said first threshold associated with said on-chain first transfer modality as a default scalar quantity.

5. The method of claim 1, wherein said on-chain batch data distribution to said numerous taskset participants is also partly based on said first and second taskset participants each having opted into said on-chain batch data distribution after receiving said eligibility notification signaling said on-chain batch data distribution and before said on-chain batch data distribution is triggered; wherein said eligibility notification presents said first threshold associated with said on-chain first transfer modality as a default scalar quantity; wherein said first taskset participant accepts said default scalar quantity and said second taskset participant replaces said default scalar quantity with a larger value; and wherein said batch data distribution to said first and second taskset participants is performed using said default scalar quantity and said larger value respectively.

6. The method of claim 1, wherein said on-chain batch data distribution includes a transmission to an additional taskset participant as a component of said on-chain batch data distribution to said numerous taskset participants; and wherein said on-chain batch data distribution to said numerous taskset participants is also partly based on said first and second taskset participants each having opted into said on-chain batch data distribution after receiving said eligibility notification signaling said on-chain batch data distribution and before said on-chain batch data distribution is triggered.

7. The method of claim 1, wherein said on-chain batch data distribution includes a transmission to an additional taskset participant as a component of said on-chain batch data distribution to said numerous taskset participants; wherein said on-chain batch data distribution to said numerous taskset participants is partly based on said off-chain batch evaluations of said aggregate performances of said first and second taskset participants each exceeding said first threshold associated with said on-chain first transfer modality and partly based on an off-chain batch evaluation of an aggregate performance of said additional taskset participant also exceeding said first threshold associated with said on-chain first transfer modality; and wherein said first, second and third taskset participants have all requested to participate in said on-chain batch data distribution but in which said data distribution system is only configured to send manually triggered information relating to said on-chain first transfer modality to said additional taskset participant.

8. The method of claim 1, wherein said method implements another method comprising:
invoking transistor-based circuitry configured to notify said first taskset participant of an opportunity to receive a first resource by completing said first taskset;
invoking transistor-based circuitry configured to allow said first taskset participant to receive said first resource by completing said first taskset;
invoking transistor-based circuitry configured to notify said first taskset participant of having received said first resource in lieu of signaling any immediate eligibility for any in-kind dispensation as a conditional response partly based on said first taskset participant having completed said first taskset and partly based on an aggregated amount that includes said first resource not exceeding said first threshold associated with said on-chain first transfer modality;
invoking transistor-based circuitry configured to notify said first taskset participant of an opportunity to receive a second resource by completing a second taskset;
invoking transistor-based circuitry configured to allow said first taskset participant to receive said second resource by completing said second taskset, wherein said first taskset participant is notified of having received an eligibility to receive an in-kind dispensation associated with said aggregate performance of said first taskset participant that includes first and second tasksets completed by said first taskset participant as a conditional response partly based on said first taskset participant having completed said first and second tasksets and partly based on said aggregate performance exceeding said first threshold associated with said on-chain first transfer modality, and wherein said second taskset is unlocked to said first taskset participant by said first taskset participant having completed said first taskset; and
implementing said in-kind dispensation associated with said aggregated amount that includes said first and second resources as a conditional response to a dispensation request from said first taskset participant, wherein said in-kind dispensation is a component of said on-chain batch data distribution.

9. A method of operating a data distribution system, said method comprising:
invoking transistor-based circuitry configured to obtain an off-chain batch evaluation of an aggregate performance of a first taskset participant that includes first and second tasksets completed by said first taskset participant;
invoking transistor-based circuitry configured to obtain an off-chain batch evaluation of an aggregate performance of a second taskset participant that includes first and second tasksets completed by said second taskset participant;
invoking transistor-based circuitry configured to signal a first eligibility to said first taskset participant as an automatic and conditional response partly based on said first taskset participant signaling a preference for an on-chain first transfer modality over one or more other transfer modalities and partly based on said off-chain batch evaluation of said aggregate performance of said first taskset participant exceeding a first threshold associated with said on-chain first transfer modality;

invoking transistor-based circuitry configured to signal a first eligibility to said second taskset participant an automatic and conditional response partly based on said second taskset participant signaling a preference for said on-chain first transfer modality over one or more other transfer modalities and partly based on said off-chain batch evaluation of said aggregate performance of said first taskset participant exceeding said first threshold associated with said on-chain first transfer modality; and determining an on-chain batch data distribution to said first and second taskset participants as a conditional response partly based on said off-chain batch evaluations of said aggregate performances of said first and second taskset participants each exceeding said first threshold associated with said on-chain first transfer modality and partly based on said first and second taskset participants both having consented to participate in said on-chain batch data distribution; wherein said first taskset participant of has been notified of an opportunity to receive a first resource by completing said first taskset; wherein said first taskset includes viewing training materials online; wherein said first taskset participant has been allowed to receive said first resource by completing said first taskset; wherein said first taskset participant has been notified of having received said first resource in lieu of signaling any immediate eligibility for any in-kind dispensation as a conditional response partly based on said first taskset participant having completed said first taskset and partly based on an aggregated amount that includes said first resource not exceeding said first threshold associated with said on-chain first transfer modality; wherein said first taskset participant has been notified of an opportunity to receive said second resource by completing said second taskset; wherein said second taskset include a skilled task relating to said training materials; wherein said first taskset participant has been allowed to receive said second resource by completing said second taskset; wherein said first taskset participant has been notified of having received an eligibility to receive an in-kind dispensation associated with said aggregate performance of said first taskset participant that includes said first and second tasksets completed by said first taskset participant as a conditional response partly based on said first taskset participant having completed said first and second tasksets and partly based on said aggregate performance exceeding said first threshold associated with said on-chain first transfer modality; wherein said second taskset including said skilled task relating to said training materials has been unlocked to said first taskset participant by said first taskset participant having completed said first taskset including viewing said training materials; wherein said in-kind dispensation associated with said aggregated amount that includes said first and second resources has been implemented as a conditional response to a dispensation request from said first taskset participant; and wherein said in-kind dispensation is a component of said on-chain batch data distribution; and executing said on-chain batch data distribution to said numerous taskset participants including first special-purpose hardware implementing a first digital wallet configured as a first destination of said on-chain batch data distribution and second special-purpose hardware implementing a second digital wallet configured as a second destination of said on-chain batch data distribution, wherein said first digital wallet contains a first private key and wherein said on-chain batch data distribution includes crypto assets that express one or more indexes that can later be retrieved by said first taskset participant using said first private key.

10. The method of claim 9, wherein said method implements another method comprising:

invoking transistor-based circuitry configured to notify said first taskset participant of an opportunity to receive a first resource by completing said first taskset;

invoking transistor-based circuitry configured to allow said first taskset participant to receive said first resource by completing said first taskset;

invoking transistor-based circuitry configured to notify said first taskset participant of having received said first resource in lieu of signaling any immediate eligibility for any in-kind dispensation as a conditional response partly based on said first taskset participant having completed said first taskset and partly based on an aggregated amount that includes said first resource not exceeding said first threshold associated with said on-chain first transfer modality;

invoking transistor-based circuitry configured to notify said first taskset participant of an opportunity to receive a second resource by completing a second taskset;

invoking transistor-based circuitry configured to allow said first taskset participant to receive said second resource by completing said second taskset, wherein said first taskset participant is notified of having received an eligibility to receive an in-kind dispensation associated with said aggregate performance of said first taskset participant that includes first and second tasksets completed by said first taskset participant as a conditional response partly based on said first taskset participant having completed said first and second tasksets and partly based on said aggregate performance exceeding said first threshold associated with said on-chain first transfer modality, and wherein said second taskset is unlocked to said first taskset participant by said first taskset participant having completed said first taskset; and implementing said in-kind dispensation associated with said aggregated amount that includes said first and second resources as a conditional response to a dispensation request from said first taskset participant, wherein said in-kind dispensation is a component of said on-chain batch data distribution.

11. The method of claim 9, further comprising:

initially setting preferences negatively for components of said on-chain batch data distribution of said first and second taskset participants respectively.

12. The method of claim 9, wherein an eligibility notification signaling said first eligibility is received by each of said taskset participants before said taskset participants each consented to participate in said on-chain batch data distribution and wherein said taskset participants each consented to participate in said on-chain batch data distribution before said on-chain batch data distribution was triggered.

13. The method of claim 9, wherein an eligibility notification signaling said first eligibility simultaneously to said first taskset participant presents both a user-actionable eligibility notification control allowing said eligibility to be toggled selectively and a user-actionable batch distribution control allowing participation in said on-chain batch data distribution to be toggled selectively.

14. The method of claim 9, wherein an eligibility notification signaling said first eligibility presents a first user-actionable batch distribution control; and wherein at least said first and second taskset participants each manifest opting into said on-chain batch data distribution by actuating said user-actionable batch distribution control.

15. The method of claim 9, wherein an eligibility notification signaling said first eligibility presents a first user-actionable batch distribution control; wherein at least said first and second taskset participants each manifest opting into said on-chain batch data distribution by actuating said user-actionable batch distribution control; and wherein said on-chain batch data distribution also includes a transmission to an additional taskset participant whose aggregate performance exceeds said first threshold as a component of said conditional response partly based on said additional taskset participant having consented to participate in said on-chain batch data distribution whose implementation of said on-chain first transfer modality includes a setting having a default value by which said on-chain first transfer modality is set to include said additional taskset participant as a recipient in said on-chain batch data distribution.

16. The method of claim 9, wherein an eligibility notification signaling said first eligibility presents a first user-actionable batch distribution control; wherein at least said first and second taskset participants each manifest opting into said on-chain batch data distribution by actuating said user-actionable batch distribution control; wherein said on-chain batch data distribution also includes a transmission to an additional taskset participant whose aggregate performance exceeds said first threshold as a component of said conditional response partly based on said additional taskset participant having consented to participate in said on-chain batch data distribution whose implementation of said on-chain first transfer modality includes a setting having a default value by which said on-chain first transfer modality is set to include said additional taskset participant as a recipient in said on-chain batch data distribution; and wherein said on-chain batch data distribution includes said first and second taskset participants but not said additional taskset participant based on said additional taskset participant having overridden said default value before a commencement of said on-chain batch data distribution.

17. The method of claim 9, wherein (at least) an eligibility notification signaling (at least) said first eligibility presents (at least) a first user-actionable batch distribution control and wherein (at least) both of said taskset participants each manifest opting (at least) into said on-chain batch data distribution by actuating (at least) said user-actionable batch distribution control.

18. A data distribution system comprising:
transistor-based circuitry configured to obtain an off-chain batch evaluation of an aggregate performance of a first taskset participant that includes first and second tasksets completed by said first taskset participant;
transistor-based circuitry configured to obtain an off-chain batch evaluation of an aggregate performance of a second taskset participant that includes first and second tasksets completed by said second taskset participant;
transistor-based circuitry configured to signal a first eligibility to said first taskset participant as an automatic and conditional response partly based on said first taskset participant signaling a preference for an on-chain first transfer modality over one or more other transfer modalities and partly based on said off-chain batch evaluation of said aggregate performance of said first taskset participant exceeding a first threshold associated with said on-chain first transfer modality;
transistor-based circuitry configured to signal a first eligibility to said second taskset participant an automatic and conditional response partly based on said second taskset participant signaling a preference for said on-chain first transfer modality over one or more other transfer modalities and partly based on said off-chain batch evaluation of said aggregate performance of said second taskset participant exceeding said first threshold associated with said on-chain first transfer modality; and
transistor-based circuitry configured to determine an on-chain batch data distribution to said first and second taskset participants as a conditional response partly based on said off-chain batch evaluations of said aggregate performances of said first and second taskset participants each exceeding said first threshold associated with said on-chain first transfer modality and partly based on said first and second taskset participants both having consented to participate in said on-chain batch data distribution; wherein said first taskset participant of has been notified of an opportunity to receive a first resource by completing said first taskset; wherein said first taskset includes viewing training materials online; wherein said first taskset participant has been allowed to receive said first resource by completing said first taskset; wherein said first taskset participant has been notified of having received said first resource in lieu of signaling any immediate eligibility for any in-kind dispensation as a conditional response partly based on said first taskset participant having completed said first taskset and partly based on an aggregated amount that includes said first resource not exceeding said first threshold associated with said on-chain first transfer modality; wherein said first taskset participant has been notified of an opportunity to receive said second resource by completing said second taskset; wherein said second taskset include a skilled task relating to said training materials; wherein said first taskset participant has been allowed to receive said second resource by completing said second taskset; wherein said first taskset participant has been notified of having received an eligibility to receive an in-kind dispensation associated with said aggregate performance of said first taskset participant that includes said first and second tasksets completed by said first taskset participant as a conditional response partly based on said first taskset participant having completed said first and second tasksets and partly based on said aggregate performance exceeding said first threshold associated with said on-chain first transfer modality; wherein said second taskset including said skilled task relating to said training materials has been unlocked to said first taskset participant by said first taskset participant having completed said first taskset including viewing said training materials; wherein said in-kind dispensation associated with said aggregated amount that includes said first and second resources has been implemented as a conditional response to a dispensation request from said first taskset participant; and wherein said in-kind dispensation is a component of said on-chain batch data distribution; and
means for executing said on-chain batch data distribution to said numerous taskset participants including first special-purpose hardware implementing a first digital wallet configured as a first destination of said on-chain batch data distribution and second special-purpose hardware implementing a second digital wallet configured as a second destination of said on-chain batch data distribution, wherein said first digital wallet contains a first private key and wherein said on-chain batch data distribution includes crypto assets that express one or more indexes that can later be retrieved by said first taskset participant using said first private key.

19. The system of claim 18, further comprising:
a physical article implementing a digital wallet that includes special-purpose hardware configured as a first destination of said on-chain batch data distribution, wherein said digital wallet is configured to contain a private key, and wherein said on-chain batch data distribution includes crypto assets that express one or more indexes that can later be retrieved by said first taskset participant using said private key.

\* \* \* \* \*